(12) United States Patent
Celinder et al.

(10) Patent No.: US 12,033,011 B2
(45) Date of Patent: *Jul. 9, 2024

(54) PRINTER-VERIFIERS AND SYSTEMS AND METHODS FOR VERIFYING PRINTED INDICIA

(71) Applicant: Hand Held Products, Inc., Charlotte, NC (US)

(72) Inventors: Thomas Celinder, Singapore (SG); H. Sprague Ackley, Seattle, WA (US)

(73) Assignee: Hand Held Products, Inc., Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/807,214

(22) Filed: Jun. 16, 2022

(65) Prior Publication Data

US 2022/0309638 A1    Sep. 29, 2022

Related U.S. Application Data

(63) Continuation of application No. 16/743,823, filed on Jan. 15, 2020, now Pat. No. 11,430,100, which is a
(Continued)

(51) Int. Cl.
    *G06K 15/02*      (2006.01)
    *B41J 29/393*      (2006.01)
    (Continued)

(52) U.S. Cl.
    CPC .......... *G06K 15/027* (2013.01); *B41J 29/393* (2013.01); *G06K 15/4025* (2013.01);
    (Continued)

(58) Field of Classification Search
    CPC . G06K 15/027; G06K 15/4025; B41J 29/393; B41J 3/445; G06T 7/0002;
    (Continued)

(56) References Cited

U.S. PATENT DOCUMENTS 4,581,616 A    4/1986   Ross et al.
5,590,507 A    1/1997   Wyssmann
(Continued)

FOREIGN PATENT DOCUMENTS

AU    2009202557 A1    1/2011
CA    2168841 A1    8/1996
(Continued)

OTHER PUBLICATIONS

US 8,548,242 B1, 10/2013, Longacre (withdrawn)
(Continued)

*Primary Examiner* — Solomon G Bezuayehu
(74) *Attorney, Agent, or Firm* — Alston & Bird LLP

(57) ABSTRACT

A printer-verifier is provided for printing and verifying a printed indicium. Printer-verifier includes imaging module for capturing image of printed indicium on print media, memory communicatively coupled to imaging module and configured to store print quality verification program, and processor communicatively coupled to memory. Processor is configured by print quality verification program to evaluate print quality of printed indicium, determine if print quality meets print quality standard, reject printed indicium on print media as rejected printed media when print quality does not meet print quality standard, and one of output location-specific feedback about rejected printed media or send a command signal to cutting device to destroy rejected printed media. Location-specific feedback is in same language as language associated with printer-verifier. A printer and methods for verifying the printed indicium are also provided.

20 Claims, 6 Drawing Sheets

Related U.S. Application Data continuation of application No. 16/379,380, filed on Apr. 9, 2019, now Pat. No. 10,559,075, which is a continuation of application No. 15/382,814, filed on Dec. 19, 2016, now Pat. No. 10,304,174.

(51) Int. Cl.
  *G06K 15/00* (2006.01)
  *G06T 7/00* (2017.01)
  *H04N 1/32* (2006.01)

(52) U.S. Cl.
  CPC ........ G06T 7/0002 (2013.01); H04N 1/32144 (2013.01); *G06T 2207/30144* (2013.01); *G06T 2207/30176* (2013.01); *H04N 2201/3253* (2013.01)

(58) Field of Classification Search
  CPC ........... G06T 2207/30144; G06T 2207/30176; H04N 1/32144; H04N 2201/3253; H04N 2201/325
  See application file for complete search history.

(56) References Cited

U.S. PATENT DOCUMENTS

| | | | |
|---|---|---|---|
| 6,024,289 A | 2/2000 | Ackley | |
| 6,032,861 A | 3/2000 | Lemelson et al. | |
| 6,042,279 A | 3/2000 | Ackley | |
| 6,074,081 A | 6/2000 | Smith et al. | |
| 6,151,534 A | 11/2000 | Smith et al. | |
| 6,275,304 B1 | 8/2001 | Eschbach et al. | |
| 6,473,728 B1 * | 10/2002 | Tognazzini | B41J 3/36 704/7 |
| 6,477,266 B1 * | 11/2002 | Asar | G01N 21/95607 382/147 |
| 6,832,725 B2 | 12/2004 | Gardiner et al. | |
| 7,031,002 B1 | 4/2006 | Taieb | |
| 7,128,266 B2 | 10/2006 | Zhu et al. | |
| 7,159,783 B2 | 1/2007 | Walczyk et al. | |
| 7,413,127 B2 | 8/2008 | Ehrhart et al. | |
| 7,427,002 B2 | 9/2008 | Liff et al. | |
| 7,726,575 B2 | 6/2010 | Wang et al. | |
| 7,813,308 B2 | 10/2010 | Reddy et al. | |
| 8,294,969 B2 | 10/2012 | Plesko | |
| 8,317,105 B2 | 11/2012 | Kotlarsky et al. | |
| 8,322,622 B2 | 12/2012 | Liu | |
| 8,366,005 B2 | 2/2013 | Kotlarsky et al. | |
| 8,371,507 B2 | 2/2013 | Haggerty et al. | |
| 8,376,233 B2 | 2/2013 | Horn et al. | |
| 8,381,979 B2 | 2/2013 | Franz | |
| 8,390,909 B2 | 3/2013 | Plesko | |
| 8,408,464 B2 | 4/2013 | Zhu et al. | |
| 8,408,468 B2 | 4/2013 | Van et al. | |
| 8,408,469 B2 | 4/2013 | Good | |
| 8,424,768 B2 | 4/2013 | Rueblinger et al. | |
| 8,448,863 B2 | 5/2013 | Xian et al. | |
| 8,457,013 B2 | 6/2013 | Essinger et al. | |
| 8,459,557 B2 | 6/2013 | Havens et al. | |
| 8,469,272 B2 | 6/2013 | Kearney | |
| 8,474,712 B2 | 7/2013 | Kearney et al. | |
| 8,479,992 B2 | 7/2013 | Kotlarsky et al. | |
| 8,490,877 B2 | 7/2013 | Kearney | |
| 8,504,427 B2 | 8/2013 | Quinlan et al. | |
| 8,517,271 B2 | 8/2013 | Kotlarsky et al. | |
| 8,523,076 B2 | 9/2013 | Good | |
| 8,528,818 B2 | 9/2013 | Ehrhart et al. | |
| 8,544,737 B2 | 10/2013 | Gomez et al. | |
| 8,548,420 B2 | 10/2013 | Grunow et al. | |
| 8,550,335 B2 | 10/2013 | Samek et al. | |
| 8,550,354 B2 | 10/2013 | Gannon et al. | |
| 8,550,357 B2 | 10/2013 | Kearney | |
| 8,556,174 B2 | 10/2013 | Kosecki et al. | |
| 8,556,176 B2 | 10/2013 | Van et al. | |
| 8,556,177 B2 | 10/2013 | Hussey et al. | |
| 8,559,767 B2 | 10/2013 | Barber et al. | |
| 8,561,895 B2 | 10/2013 | Gomez et al. | |
| 8,561,903 B2 | 10/2013 | Sauerwein, Jr. | |
| 8,561,905 B2 | 10/2013 | Edmonds et al. | |
| 8,565,107 B2 | 10/2013 | Pease et al. | |
| 8,571,307 B2 | 10/2013 | Li et al. | |
| 8,579,200 B2 | 11/2013 | Samek et al. | |
| 8,583,924 B2 | 11/2013 | Caballero et al. | |
| 8,584,945 B2 | 11/2013 | Wang et al. | |
| 8,587,595 B2 | 11/2013 | Wang | |
| 8,587,697 B2 | 11/2013 | Hussey et al. | |
| 8,588,869 B2 | 11/2013 | Sauerwein et al. | |
| 8,590,789 B2 | 11/2013 | Nahill et al. | |
| 8,596,539 B2 | 12/2013 | Havens et al. | |
| 8,596,542 B2 | 12/2013 | Havens et al. | |
| 8,596,543 B2 | 12/2013 | Havens et al. | |
| 8,599,271 B2 | 12/2013 | Havens et al. | |
| 8,599,957 B2 | 12/2013 | Peake et al. | |
| 8,600,158 B2 | 12/2013 | Li et al. | |
| 8,600,167 B2 | 12/2013 | Showering | |
| 8,602,309 B2 | 12/2013 | Longacre et al. | |
| 8,608,053 B2 | 12/2013 | Meier et al. | |
| 8,608,071 B2 | 12/2013 | Liu et al. | |
| 8,611,309 B2 | 12/2013 | Wang et al. | |
| 8,615,487 B2 | 12/2013 | Gomez et al. | |
| 8,621,123 B2 | 12/2013 | Caballero | |
| 8,622,303 B2 | 1/2014 | Meier et al. | |
| 8,628,013 B2 | 1/2014 | Ding | |
| 8,628,015 B2 | 1/2014 | Wang et al. | |
| 8,628,016 B2 | 1/2014 | Winegar | |
| 8,629,926 B2 | 1/2014 | Wang | |
| 8,630,491 B2 | 1/2014 | Longacre et al. | |
| 8,635,309 B2 | 1/2014 | Berthiaume et al. | |
| 8,636,200 B2 | 1/2014 | Kearney | |
| 8,636,212 B2 | 1/2014 | Nahill et al. | |
| 8,636,215 B2 | 1/2014 | Ding et al. | |
| 8,636,224 B2 | 1/2014 | Wang | |
| 8,638,806 B2 | 1/2014 | Wang et al. | |
| 8,640,958 B2 | 2/2014 | Lu et al. | |
| 8,640,960 B2 | 2/2014 | Wang et al. | |
| 8,643,717 B2 | 2/2014 | Li et al. | |
| 8,646,692 B2 | 2/2014 | Meier et al. | |
| 8,646,694 B2 | 2/2014 | Wang et al. | |
| 8,657,200 B2 | 2/2014 | Ren et al. | |
| 8,659,397 B2 | 2/2014 | Vargo et al. | |
| 8,668,149 B2 | 3/2014 | Good | |
| 8,678,285 B2 | 3/2014 | Kearney | |
| 8,678,286 B2 | 3/2014 | Smith et al. | |
| 8,682,077 B1 | 3/2014 | Longacre, Jr. | |
| D702,237 S | 4/2014 | Oberpriller et al. | |
| 8,687,282 B2 | 4/2014 | Feng et al. | |
| 8,692,927 B2 | 4/2014 | Pease et al. | |
| 8,695,880 B2 | 4/2014 | Bremer et al. | |
| 8,698,949 B2 | 4/2014 | Grunow et al. | |
| 8,702,000 B2 | 4/2014 | Barber et al. | |
| 8,717,494 B2 | 5/2014 | Gannon | |
| 8,720,783 B2 | 5/2014 | Biss et al. | |
| 8,723,804 B2 | 5/2014 | Fletcher et al. | |
| 8,723,904 B2 | 5/2014 | Marty et al. | |
| 8,727,223 B2 | 5/2014 | Wang | |
| 8,740,082 B2 | 6/2014 | Wilz, Sr. | |
| 8,740,085 B2 | 6/2014 | Furlong et al. | |
| 8,746,563 B2 | 6/2014 | Hennick et al. | |
| 8,750,445 B2 | 6/2014 | Peake et al. | |
| 8,752,766 B2 | 6/2014 | Xian et al. | |
| 8,756,059 B2 | 6/2014 | Braho et al. | |
| 8,757,495 B2 | 6/2014 | Qu et al. | |
| 8,760,563 B2 | 6/2014 | Koziol et al. | |
| 8,763,909 B2 | 7/2014 | Reed et al. | |
| 8,777,108 B2 | 7/2014 | Coyle | |
| 8,777,109 B2 | 7/2014 | Oberpriller et al. | |
| 8,779,898 B2 | 7/2014 | Havens et al. | |
| 8,781,520 B2 | 7/2014 | Payne et al. | |
| 8,783,573 B2 | 7/2014 | Havens et al. | |
| 8,789,757 B2 | 7/2014 | Barten | |
| 8,789,758 B2 | 7/2014 | Hawley et al. | |
| 8,789,759 B2 | 7/2014 | Xian et al. | |
| 8,794,520 B2 | 8/2014 | Wang et al. | |
| 8,794,522 B2 | 8/2014 | Ehrhart | |

(56) References Cited

U.S. PATENT DOCUMENTS

| | | |
|---|---|---|
| 8,794,525 B2 | 8/2014 | Amundsen et al. |
| 8,794,526 B2 | 8/2014 | Wang et al. |
| 8,798,367 B2 | 8/2014 | Ellis |
| 8,807,431 B2 | 8/2014 | Wang et al. |
| 8,807,432 B2 | 8/2014 | Van et al. |
| 8,820,630 B2 | 9/2014 | Qu et al. |
| 8,822,848 B2 | 9/2014 | Meagher |
| 8,824,692 B2 | 9/2014 | Sheerin et al. |
| 8,824,696 B2 | 9/2014 | Braho |
| 8,842,849 B2 | 9/2014 | Wahl et al. |
| 8,844,822 B2 | 9/2014 | Kotlarsky et al. |
| 8,844,823 B2 | 9/2014 | Fritz et al. |
| 8,849,019 B2 | 9/2014 | Li et al. |
| D716,285 S | 10/2014 | Chaney et al. |
| 8,851,383 B2 | 10/2014 | Yeakley et al. |
| 8,854,633 B2 | 10/2014 | Laffargue et al. |
| 8,866,963 B2 | 10/2014 | Grunow et al. |
| 8,868,421 B2 | 10/2014 | Braho et al. |
| 8,868,519 B2 | 10/2014 | Maloy et al. |
| 8,868,802 B2 | 10/2014 | Barten |
| 8,868,803 B2 | 10/2014 | Caballero |
| 8,870,074 B1 | 10/2014 | Gannon |
| 8,879,639 B2 | 11/2014 | Sauerwein, Jr. |
| 8,880,426 B2 | 11/2014 | Smith |
| 8,881,983 B2 | 11/2014 | Havens et al. |
| 8,881,987 B2 | 11/2014 | Wang |
| 8,903,172 B2 | 12/2014 | Smith |
| 8,908,995 B2 | 12/2014 | Benos et al. |
| 8,910,870 B2 | 12/2014 | Li et al. |
| 8,910,875 B2 | 12/2014 | Ren et al. |
| 8,914,290 B2 | 12/2014 | Hendrickson et al. |
| 8,914,788 B2 | 12/2014 | Pettinelli et al. |
| 8,915,439 B2 | 12/2014 | Feng et al. |
| 8,915,444 B2 | 12/2014 | Havens et al. |
| 8,916,789 B2 | 12/2014 | Woodburn |
| 8,918,250 B2 | 12/2014 | Hollifield |
| 8,918,564 B2 | 12/2014 | Caballero |
| 8,925,818 B2 | 1/2015 | Kosecki et al. |
| 8,939,374 B2 | 1/2015 | Jovanovski et al. |
| 8,942,480 B2 | 1/2015 | Ellis |
| 8,944,313 B2 | 2/2015 | Williams et al. |
| 8,944,327 B2 | 2/2015 | Meier et al. |
| 8,944,332 B2 | 2/2015 | Harding et al. |
| 8,950,678 B2 | 2/2015 | Germaine et al. |
| D723,560 S | 3/2015 | Zhou et al. |
| 8,967,468 B2 | 3/2015 | Gomez et al. |
| 8,971,346 B2 | 3/2015 | Sevier |
| 8,976,030 B2 | 3/2015 | Cunningham et al. |
| 8,976,368 B2 | 3/2015 | El et al. |
| 8,978,981 B2 | 3/2015 | Guan |
| 8,978,983 B2 | 3/2015 | Bremer et al. |
| 8,978,984 B2 | 3/2015 | Hennick et al. |
| 8,985,456 B2 | 3/2015 | Zhu et al. |
| 8,985,457 B2 | 3/2015 | Soule et al. |
| 8,985,459 B2 | 3/2015 | Kearney et al. |
| 8,985,461 B2 | 3/2015 | Gelay et al. |
| 8,988,578 B2 | 3/2015 | Showering |
| 8,988,590 B2 | 3/2015 | Gillet et al. |
| 8,991,704 B2 | 3/2015 | Hopper et al. |
| 8,996,194 B2 | 3/2015 | Davis et al. |
| 8,996,384 B2 | 3/2015 | Funyak et al. |
| 8,998,091 B2 | 4/2015 | Edmonds et al. |
| 9,002,641 B2 | 4/2015 | Showering |
| 9,007,368 B2 | 4/2015 | Laffargue et al. |
| 9,010,641 B2 | 4/2015 | Qu et al. |
| 9,015,513 B2 | 4/2015 | Murawski et al. |
| 9,016,576 B2 | 4/2015 | Brady et al. |
| D730,357 S | 5/2015 | Fitch et al. |
| 9,022,288 B2 | 5/2015 | Nahill et al. |
| 9,030,964 B2 | 5/2015 | Essinger et al. |
| 9,033,240 B2 | 5/2015 | Smith et al. |
| 9,033,242 B2 | 5/2015 | Gillet et al. |
| 9,036,054 B2 | 5/2015 | Koziol et al. |
| 9,037,344 B2 | 5/2015 | Chamberlin |
| 9,038,911 B2 | 5/2015 | Xian et al. |
| 9,038,915 B2 | 5/2015 | Smith |
| D730,901 S | 6/2015 | Oberpriller et al. |
| D730,902 S | 6/2015 | Fitch et al. |
| D733,112 S | 6/2015 | Chaney et al. |
| 9,047,098 B2 | 6/2015 | Barten |
| 9,047,359 B2 | 6/2015 | Caballero et al. |
| 9,047,420 B2 | 6/2015 | Caballero |
| 9,047,525 B2 | 6/2015 | Barber et al. |
| 9,047,531 B2 | 6/2015 | Showering et al. |
| 9,049,640 B2 | 6/2015 | Wang et al. |
| 9,053,055 B2 | 6/2015 | Caballero |
| 9,053,378 B1 | 6/2015 | Hou et al. |
| 9,053,380 B2 | 6/2015 | Xian et al. |
| 9,057,641 B2 | 6/2015 | Amundsen et al. |
| 9,058,526 B2 | 6/2015 | Powilleit |
| 9,064,165 B2 | 6/2015 | Havens et al. |
| 9,064,167 B2 | 6/2015 | Xian et al. |
| 9,064,168 B2 | 6/2015 | Todeschini et al. |
| 9,064,254 B2 | 6/2015 | Todeschini et al. |
| 9,066,032 B2 | 6/2015 | Wang |
| 9,070,032 B2 | 6/2015 | Corcoran |
| D734,339 S | 7/2015 | Zhou et al. |
| D734,751 S | 7/2015 | Oberpriller et al. |
| 9,082,023 B2 | 7/2015 | Feng et al. |
| 9,171,539 B2 | 10/2015 | Funyak et al. |
| 9,224,022 B2 | 12/2015 | Ackley et al. |
| 9,224,027 B2 | 12/2015 | Van et al. |
| D747,321 S | 1/2016 | London et al. |
| 9,230,140 B1 * | 1/2016 | Ackley ............... G06T 7/0004 |
| 9,250,712 B1 | 2/2016 | Todeschini |
| 9,258,033 B2 | 2/2016 | Showering |
| 9,261,398 B2 | 2/2016 | Amundsen et al. |
| 9,262,633 B1 | 2/2016 | Todeschini et al. |
| 9,262,662 B2 | 2/2016 | Chen et al. |
| 9,262,664 B2 | 2/2016 | Soule et al. |
| 9,274,806 B2 | 3/2016 | Barten |
| 9,282,501 B2 | 3/2016 | Wang et al. |
| 9,292,969 B2 | 3/2016 | Laffargue et al. |
| 9,298,667 B2 | 3/2016 | Caballero |
| 9,310,609 B2 | 4/2016 | Rueblinger et al. |
| 9,319,548 B2 | 4/2016 | Showering et al. |
| D757,009 S | 5/2016 | Oberpriller et al. |
| 9,342,724 B2 | 5/2016 | McCloskey et al. |
| 9,342,827 B2 | 5/2016 | Smith |
| 9,355,294 B2 | 5/2016 | Smith et al. |
| 9,367,722 B2 | 6/2016 | Xian et al. |
| 9,373,018 B2 | 6/2016 | Colavito et al. |
| 9,375,945 B1 | 6/2016 | Bowles |
| D760,719 S | 7/2016 | Zhou et al. |
| 9,390,596 B1 | 7/2016 | Todeschini |
| 9,396,375 B2 | 7/2016 | Qu et al. |
| 9,398,008 B2 | 7/2016 | Todeschini et al. |
| D762,604 S | 8/2016 | Fitch et al. |
| D762,647 S | 8/2016 | Fitch et al. |
| 9,405,011 B2 | 8/2016 | Showering |
| 9,407,840 B2 | 8/2016 | Wang |
| 9,412,242 B2 | 8/2016 | Van et al. |
| 9,418,252 B2 | 8/2016 | Nahill et al. |
| D766,244 S | 9/2016 | Zhou et al. |
| 9,443,123 B2 | 9/2016 | Hejl |
| 9,443,222 B2 | 9/2016 | Singel et al. |
| 9,448,610 B2 | 9/2016 | Davis et al. |
| 9,478,113 B2 | 10/2016 | Xie et al. |
| D771,631 S | 11/2016 | Fitch et al. |
| 9,507,974 B1 | 11/2016 | Todeschini |
| D777,166 S | 1/2017 | Bidwell et al. |
| 9,557,166 B2 | 1/2017 | Thuries et al. |
| 9,564,035 B2 | 2/2017 | Ackley et al. |
| 9,582,696 B2 | 2/2017 | Barber et al. |
| D783,601 S | 4/2017 | Schulte et al. |
| 9,616,749 B2 | 4/2017 | Chamberlin |
| 9,618,993 B2 | 4/2017 | Murawski et al. |
| D785,617 S | 5/2017 | Bidwell et al. |
| D785,636 S | 5/2017 | Oberpriller et al. |
| 9,659,183 B2 | 5/2017 | Zhu et al. |
| 9,665,757 B2 | 5/2017 | Feng et al. |
| D790,505 S | 6/2017 | Vargo et al. |
| D790,546 S | 6/2017 | Zhou et al. |
| D790,553 S | 6/2017 | Fitch et al. |

(56) References Cited

U.S. PATENT DOCUMENTS

| | | |
|---|---|---|
| 9,715,614 B2 | 7/2017 | Todeschini et al. |
| 9,734,493 B2 | 8/2017 | Gomez et al. |
| 9,752,864 B2 | 9/2017 | Laffargue et al. |
| 9,762,793 B2 | 9/2017 | Ackley et al. |
| 9,767,581 B2 | 9/2017 | Todeschini |
| 9,786,101 B2 | 10/2017 | Ackley |
| 9,794,392 B2 | 10/2017 | Hejl |
| 9,823,059 B2 | 11/2017 | Li et al. |
| 9,826,106 B2 | 11/2017 | Ackley |
| 9,852,102 B2 | 12/2017 | Kohtz et al. |
| 9,857,167 B2 | 1/2018 | Jovanovski et al. |
| 9,861,182 B2 | 1/2018 | Oberpriller et al. |
| 9,891,612 B2 | 2/2018 | Charpentier et al. |
| 9,892,876 B2 | 2/2018 | Bandringa |
| 9,897,434 B2 | 2/2018 | Ackley et al. |
| 9,924,006 B2 | 3/2018 | Schoon et al. |
| 9,930,050 B2 | 3/2018 | Yeakley et al. |
| 9,954,871 B2 | 4/2018 | Hussey et al. |
| 9,978,088 B2 | 5/2018 | Pape |
| 9,984,685 B2 | 5/2018 | Braho et al. |
| 10,007,112 B2 | 6/2018 | Fitch et al. |
| 10,019,334 B2 | 7/2018 | Caballero et al. |
| 10,021,043 B2 | 7/2018 | Sevier |
| 10,038,716 B2 | 7/2018 | Todeschini et al. |
| 10,060,729 B2 | 8/2018 | Laffargue et al. |
| 10,066,982 B2 | 9/2018 | Ackley et al. |
| 10,121,466 B2 | 11/2018 | Pecorari |
| 10,139,495 B2 | 11/2018 | Payne |
| 10,269,342 B2 | 4/2019 | Braho et al. |
| 10,304,174 B2 | 5/2019 | Celinder et al. |
| 10,327,158 B2 | 6/2019 | Wang et al. |
| 10,360,728 B2 | 7/2019 | Venkatesha et al. |
| 10,401,436 B2 | 9/2019 | Young et al. |
| 10,559,075 B2 | 2/2020 | Celinder et al. |
| 11,430,100 B2 | 8/2022 | Celinder et al. |
| 2003/0234960 A1* | 12/2003 | Kaltenbach ............... G06K 5/02 358/3.26 |
| 2004/0100622 A1* | 5/2004 | Kaltenbach ............ B41J 11/008 396/311 |
| 2005/0109810 A1* | 5/2005 | Mkrtchyan ............. G07F 17/42 225/93 |
| 2007/0063048 A1 | 3/2007 | Havens et al. |
| 2008/0185432 A1 | 8/2008 | Caballero et al. |
| 2009/0089172 A1* | 4/2009 | Quinlan ................. G06Q 30/06 705/17 |
| 2009/0134221 A1 | 5/2009 | Zhu et al. |
| 2009/0148002 A1* | 6/2009 | Spitzig .................... B41J 29/393 382/112 |
| 2010/0012736 A1 | 1/2010 | Wilds et al. |
| 2010/0177076 A1 | 7/2010 | Essinger et al. |
| 2010/0177080 A1 | 7/2010 | Essinger et al. |
| 2010/0177707 A1 | 7/2010 | Essinger et al. |
| 2010/0177749 A1 | 7/2010 | Essinger et al. |
| 2010/0265880 A1 | 10/2010 | Rautiola et al. |
| 2011/0119606 A1 | 5/2011 | Abe |
| 2011/0135321 A1 | 6/2011 | Koichi |
| 2011/0169999 A1 | 7/2011 | Grunow et al. |
| 2011/0202554 A1 | 8/2011 | Powilleit et al. |
| 2011/0231008 A1 | 9/2011 | McIntee |
| 2011/0238421 A1* | 9/2011 | Nobutani .................. B41J 3/44 704/E13.011 |
| 2012/0072595 A1 | 3/2012 | St et al. |
| 2012/0111946 A1 | 5/2012 | Golant |
| 2012/0132370 A1 | 5/2012 | Chen |
| 2012/0168511 A1 | 7/2012 | Kotlarsky et al. |
| 2012/0168512 A1 | 7/2012 | Kotlarsky et al. |
| 2012/0193423 A1 | 8/2012 | Samek |
| 2012/0203647 A1 | 8/2012 | Smith |
| 2012/0223141 A1 | 9/2012 | Good et al. |
| 2012/0228382 A1 | 9/2012 | Havens et al. |
| 2012/0248188 A1 | 10/2012 | Kearney |
| 2012/0257917 A1 | 10/2012 | Bockus et al. |
| 2012/0273576 A1* | 11/2012 | Tomczyk ................ B42D 25/21 235/488 |
| 2013/0043312 A1 | 2/2013 | Van Horn |
| 2013/0075168 A1 | 3/2013 | Amundsen et al. |
| 2013/0082104 A1 | 4/2013 | Kearney et al. |
| 2013/0175341 A1 | 7/2013 | Kearney et al. |
| 2013/0175343 A1 | 7/2013 | Good |
| 2013/0215210 A1* | 8/2013 | McNestry ............... B41J 35/36 347/214 |
| 2013/0257744 A1 | 10/2013 | Daghigh et al. |
| 2013/0257759 A1 | 10/2013 | Daghigh |
| 2013/0270346 A1 | 10/2013 | Xian et al. |
| 2013/0287258 A1 | 10/2013 | Kearney |
| 2013/0292475 A1 | 11/2013 | Kotlarsky et al. |
| 2013/0292477 A1 | 11/2013 | Hennick et al. |
| 2013/0293539 A1 | 11/2013 | Hunt et al. |
| 2013/0293540 A1 | 11/2013 | Laffargue et al. |
| 2013/0306728 A1 | 11/2013 | Thuries et al. |
| 2013/0306731 A1 | 11/2013 | Pedrao |
| 2013/0307964 A1 | 11/2013 | Bremer et al. |
| 2013/0308625 A1 | 11/2013 | Park et al. |
| 2013/0313324 A1 | 11/2013 | Koziol et al. |
| 2013/0313325 A1 | 11/2013 | Wilz et al. |
| 2013/0342717 A1 | 12/2013 | Havens et al. |
| 2014/0001267 A1 | 1/2014 | Giordano et al. |
| 2014/0002828 A1 | 1/2014 | Laffargue et al. |
| 2014/0008439 A1 | 1/2014 | Wang |
| 2014/0025584 A1 | 1/2014 | Liu et al. |
| 2014/0034734 A1 | 2/2014 | Sauerwein, Jr. |
| 2014/0036848 A1 | 2/2014 | Pease et al. |
| 2014/0039693 A1 | 2/2014 | Havens et al. |
| 2014/0042814 A1 | 2/2014 | Kather et al. |
| 2014/0049120 A1 | 2/2014 | Kohtz et al. |
| 2014/0049635 A1 | 2/2014 | Laffargue et al. |
| 2014/0061306 A1 | 3/2014 | Wu et al. |
| 2014/0063289 A1 | 3/2014 | Hussey et al. |
| 2014/0066136 A1 | 3/2014 | Sauerwein et al. |
| 2014/0067692 A1 | 3/2014 | Ye et al. |
| 2014/0070005 A1 | 3/2014 | Nahill et al. |
| 2014/0071840 A1 | 3/2014 | Venancio |
| 2014/0074746 A1 | 3/2014 | Wang |
| 2014/0076974 A1 | 3/2014 | Havens et al. |
| 2014/0078341 A1 | 3/2014 | Havens et al. |
| 2014/0078342 A1 | 3/2014 | Li et al. |
| 2014/0078345 A1 | 3/2014 | Showering |
| 2014/0097249 A1 | 4/2014 | Gomez et al. |
| 2014/0098792 A1 | 4/2014 | Wang et al. |
| 2014/0100774 A1 | 4/2014 | Showering |
| 2014/0100813 A1 | 4/2014 | Showering |
| 2014/0103115 A1 | 4/2014 | Meier et al. |
| 2014/0104413 A1 | 4/2014 | McCloskey et al. |
| 2014/0104414 A1 | 4/2014 | McCloskey et al. |
| 2014/0104416 A1 | 4/2014 | Giordano et al. |
| 2014/0104451 A1 | 4/2014 | Todeschini et al. |
| 2014/0106594 A1 | 4/2014 | Skvoretz |
| 2014/0106725 A1 | 4/2014 | Sauerwein, Jr. |
| 2014/0108010 A1 | 4/2014 | Maltseff et al. |
| 2014/0108402 A1 | 4/2014 | Gomez et al. |
| 2014/0108682 A1 | 4/2014 | Caballero |
| 2014/0110485 A1 | 4/2014 | Toa et al. |
| 2014/0114530 A1 | 4/2014 | Fitch et al. |
| 2014/0124577 A1 | 5/2014 | Wang et al. |
| 2014/0124579 A1 | 5/2014 | Ding |
| 2014/0125842 A1 | 5/2014 | Winegar |
| 2014/0125853 A1 | 5/2014 | Wang |
| 2014/0125999 A1 | 5/2014 | Longacre et al. |
| 2014/0129378 A1 | 5/2014 | Richardson |
| 2014/0131438 A1 | 5/2014 | Kearney |
| 2014/0131441 A1 | 5/2014 | Nahill et al. |
| 2014/0131443 A1 | 5/2014 | Smith |
| 2014/0131444 A1 | 5/2014 | Wang |
| 2014/0131445 A1 | 5/2014 | Ding et al. |
| 2014/0131448 A1 | 5/2014 | Xian et al. |
| 2014/0133379 A1 | 5/2014 | Wang et al. |
| 2014/0136208 A1 | 5/2014 | Maltseff et al. |
| 2014/0140585 A1 | 5/2014 | Wang |
| 2014/0151453 A1 | 6/2014 | Meier et al. |
| 2014/0152882 A1 | 6/2014 | Samek et al. |
| 2014/0158770 A1 | 6/2014 | Sevier et al. |
| 2014/0159869 A1 | 6/2014 | Zumsteg et al. |
| 2014/0166755 A1 | 6/2014 | Liu et al. |

(56) References Cited

U.S. PATENT DOCUMENTS

| | | |
|---|---|---|
| 2014/0166757 A1 | 6/2014 | Smith |
| 2014/0166759 A1 | 6/2014 | Liu et al. |
| 2014/0168787 A1 | 6/2014 | Wang et al. |
| 2014/0175165 A1 | 6/2014 | Havens et al. |
| 2014/0175172 A1 | 6/2014 | Jovanovski et al. |
| 2014/0191644 A1 | 7/2014 | Chaney |
| 2014/0191913 A1 | 7/2014 | Ge et al. |
| 2014/0197238 A1 | 7/2014 | Liu et al. |
| 2014/0197239 A1 | 7/2014 | Havens et al. |
| 2014/0197304 A1 | 7/2014 | Feng et al. |
| 2014/0203087 A1 | 7/2014 | Smith et al. |
| 2014/0204268 A1 | 7/2014 | Grunow et al. |
| 2014/0214631 A1 | 7/2014 | Hansen |
| 2014/0217166 A1 | 8/2014 | Berthiaume et al. |
| 2014/0217180 A1 | 8/2014 | Liu |
| 2014/0231500 A1 | 8/2014 | Ehrhart et al. |
| 2014/0232930 A1 | 8/2014 | Anderson |
| 2014/0247315 A1 | 9/2014 | Marty et al. |
| 2014/0263493 A1 | 9/2014 | Amurgis et al. |
| 2014/0263645 A1 | 9/2014 | Smith et al. |
| 2014/0267609 A1 | 9/2014 | Laffargue |
| 2014/0270196 A1 | 9/2014 | Braho et al. |
| 2014/0270229 A1 | 9/2014 | Braho |
| 2014/0272142 A1* | 9/2014 | Wyble ............... B42C 19/00 427/288 |
| 2014/0278387 A1 | 9/2014 | Digregorio |
| 2014/0278391 A1 | 9/2014 | Braho et al. |
| 2014/0282210 A1 | 9/2014 | Bianconi |
| 2014/0284384 A1 | 9/2014 | Lu et al. |
| 2014/0288933 A1 | 9/2014 | Braho et al. |
| 2014/0297058 A1 | 10/2014 | Barker et al. |
| 2014/0299665 A1 | 10/2014 | Barber et al. |
| 2014/0312121 A1 | 10/2014 | Lu et al. |
| 2014/0319220 A1 | 10/2014 | Coyle |
| 2014/0319221 A1 | 10/2014 | Oberpriller et al. |
| 2014/0326787 A1 | 11/2014 | Barten |
| 2014/0332590 A1 | 11/2014 | Wang et al. |
| 2014/0344943 A1 | 11/2014 | Todeschini et al. |
| 2014/0346233 A1 | 11/2014 | Liu et al. |
| 2014/0351317 A1 | 11/2014 | Smith et al. |
| 2014/0353373 A1 | 12/2014 | Van et al. |
| 2014/0361073 A1 | 12/2014 | Qu et al. |
| 2014/0361082 A1 | 12/2014 | Xian et al. |
| 2014/0362184 A1 | 12/2014 | Jovanovski et al. |
| 2014/0363015 A1 | 12/2014 | Braho |
| 2014/0369511 A1 | 12/2014 | Sheerin et al. |
| 2014/0374483 A1 | 12/2014 | Lu |
| 2014/0374485 A1 | 12/2014 | Xian et al. |
| 2015/0001301 A1 | 1/2015 | Ouyang |
| 2015/0001304 A1 | 1/2015 | Todeschini |
| 2015/0003673 A1 | 1/2015 | Fletcher |
| 2015/0009338 A1 | 1/2015 | Laffargue et al. |
| 2015/0009610 A1 | 1/2015 | London et al. |
| 2015/0014416 A1 | 1/2015 | Kotlarsky et al. |
| 2015/0021397 A1 | 1/2015 | Rueblinger et al. |
| 2015/0028102 A1 | 1/2015 | Ren et al. |
| 2015/0028103 A1 | 1/2015 | Jiang |
| 2015/0028104 A1 | 1/2015 | Ma et al. |
| 2015/0029002 A1 | 1/2015 | Yeakley et al. |
| 2015/0032709 A1 | 1/2015 | Maloy et al. |
| 2015/0039309 A1 | 2/2015 | Braho et al. |
| 2015/0039878 A1 | 2/2015 | Barten |
| 2015/0040378 A1 | 2/2015 | Saber et al. |
| 2015/0048168 A1 | 2/2015 | Fritz et al. |
| 2015/0049347 A1 | 2/2015 | Laffargue et al. |
| 2015/0051992 A1 | 2/2015 | Smith |
| 2015/0053766 A1 | 2/2015 | Havens et al. |
| 2015/0053768 A1 | 2/2015 | Wang et al. |
| 2015/0053769 A1 | 2/2015 | Thuries et al. |
| 2015/0060544 A1 | 3/2015 | Feng et al. |
| 2015/0062366 A1 | 3/2015 | Liu et al. |
| 2015/0063215 A1 | 3/2015 | Wang |
| 2015/0063676 A1 | 3/2015 | Lloyd et al. |
| 2015/0069130 A1 | 3/2015 | Gannon |
| 2015/0071819 A1 | 3/2015 | Todeschini |
| 2015/0083800 A1 | 3/2015 | Li et al. |
| 2015/0086114 A1 | 3/2015 | Todeschini |
| 2015/0088522 A1 | 3/2015 | Hendrickson et al. |
| 2015/0096872 A1 | 4/2015 | Woodburn |
| 2015/0099557 A1 | 4/2015 | Pettinelli et al. |
| 2015/0100196 A1 | 4/2015 | Hollifield |
| 2015/0102109 A1 | 4/2015 | Huck |
| 2015/0115035 A1 | 4/2015 | Meier et al. |
| 2015/0127791 A1 | 5/2015 | Kosecki et al. |
| 2015/0128116 A1 | 5/2015 | Chen et al. |
| 2015/0129659 A1 | 5/2015 | Feng et al. |
| 2015/0133047 A1 | 5/2015 | Smith et al. |
| 2015/0134470 A1 | 5/2015 | Hejl et al. |
| 2015/0136851 A1 | 5/2015 | Harding et al. |
| 2015/0136854 A1 | 5/2015 | Lu et al. |
| 2015/0142492 A1 | 5/2015 | Kumar |
| 2015/0144692 A1* | 5/2015 | Hejl ................ G06K 5/00 235/437 |
| 2015/0144698 A1 | 5/2015 | Teng et al. |
| 2015/0144701 A1 | 5/2015 | Xian et al. |
| 2015/0149946 A1 | 5/2015 | Benos et al. |
| 2015/0161429 A1 | 6/2015 | Xian |
| 2015/0169925 A1 | 6/2015 | Chen et al. |
| 2015/0169929 A1 | 6/2015 | Williams et al. |
| 2015/0178523 A1 | 6/2015 | Gelay et al. |
| 2015/0178534 A1 | 6/2015 | Jovanovski et al. |
| 2015/0178535 A1 | 6/2015 | Bremer et al. |
| 2015/0178536 A1 | 6/2015 | Hennick et al. |
| 2015/0178537 A1 | 6/2015 | El et al. |
| 2015/0181093 A1 | 6/2015 | Zhu et al. |
| 2015/0181109 A1 | 6/2015 | Gillet et al. |
| 2015/0186703 A1 | 7/2015 | Chen et al. |
| 2015/0193644 A1 | 7/2015 | Kearney et al. |
| 2015/0193645 A1 | 7/2015 | Colavito et al. |
| 2015/0199957 A1 | 7/2015 | Funyak et al. |
| 2015/0204671 A1 | 7/2015 | Showering |
| 2015/0210199 A1 | 7/2015 | Payne |
| 2015/0220753 A1 | 8/2015 | Zhu et al. |
| 2015/0221077 A1* | 8/2015 | Kawabata ............ G06T 7/337 382/141 |
| 2015/0254485 A1 | 9/2015 | Feng et al. |
| 2015/0324623 A1 | 11/2015 | Powilleit |
| 2015/0327012 A1 | 11/2015 | Bian et al. |
| 2015/0331640 A1 | 11/2015 | Matsuzaki |
| 2016/0014251 A1 | 1/2016 | Hejl |
| 2016/0019406 A1* | 1/2016 | Hejl ............... H04N 21/44008 235/462.15 |
| 2016/0040982 A1 | 2/2016 | Li et al. |
| 2016/0042241 A1 | 2/2016 | Todeschini |
| 2016/0057230 A1 | 2/2016 | Todeschini et al. |
| 2016/0109219 A1 | 4/2016 | Ackley et al. |
| 2016/0109220 A1 | 4/2016 | Laffargue et al. |
| 2016/0109224 A1 | 4/2016 | Thuries et al. |
| 2016/0112631 A1 | 4/2016 | Ackley et al. |
| 2016/0112643 A1 | 4/2016 | Laffargue et al. |
| 2016/0124516 A1 | 5/2016 | Schoon et al. |
| 2016/0125217 A1 | 5/2016 | Todeschini |
| 2016/0125342 A1 | 5/2016 | Miller et al. |
| 2016/0125873 A1 | 5/2016 | Braho et al. |
| 2016/0133253 A1 | 5/2016 | Braho et al. |
| 2016/0171720 A1 | 6/2016 | Todeschini |
| 2016/0178479 A1 | 6/2016 | Goldsmith |
| 2016/0180678 A1 | 6/2016 | Ackley et al. |
| 2016/0189087 A1 | 6/2016 | Morton et al. |
| 2016/0227912 A1 | 8/2016 | Oberpriller et al. |
| 2016/0232891 A1 | 8/2016 | Pecorari |
| 2016/0292477 A1 | 10/2016 | Bidwell |
| 2016/0294779 A1 | 10/2016 | Yeakley et al. |
| 2016/0306769 A1 | 10/2016 | Kohtz et al. |
| 2016/0314276 A1 | 10/2016 | Wilz et al. |
| 2016/0314294 A1 | 10/2016 | Kubler et al. |
| 2016/0377414 A1 | 12/2016 | Thuries et al. |
| 2018/0099516 A1 | 4/2018 | Billow et al. |
| 2018/0174287 A1* | 6/2018 | Celinder ............ G06K 15/4025 |

(56) References Cited

U.S. PATENT DOCUMENTS

| | | |
|---|---|---|
| 2018/0359371 A1 | 12/2018 | Beauquis |
| 2019/0220971 A1 | 7/2019 | Weaver |

FOREIGN PATENT DOCUMENTS

| | | |
|---|---|---|
| CN | 1187894 A | 7/1998 |
| CN | 1287922 A | 3/2001 |
| CN | 1670514 A | 9/2005 |
| CN | 1931592 A | 3/2007 |
| CN | 102463747 A | 5/2012 |
| CN | 203305669 U | 11/2013 |
| CN | 105160339 A | 12/2015 |
| CN | 204936523 U | 1/2016 |
| CN | 105667096 A | 6/2016 |
| CN | 105819052 A | 8/2016 |
| CN | 105825257 A | 8/2016 |
| DE | 19618541 A1 | 11/1996 |
| EP | 0646459 A1 | 4/1995 |
| EP | 0726143 A1 | 8/1996 |
| JP | H04-078551 A | 3/1992 |
| WO | 2013/163789 A1 | 11/2013 |
| WO | 2013/173985 A1 | 11/2013 |
| WO | 2014/019130 A1 | 2/2014 |
| WO | 2014/110495 A1 | 7/2014 |

OTHER PUBLICATIONS

US 8,616,454 B2, 12/2013, Havens et al. (withdrawn)
Annex to the communication dated Nov. 27, 2020 for EP Application No. 17205982.
Applicant Initiated Interview Summary (PTOL-413) dated Jan. 9, 2019 for U.S. Appl. No. 15/382,814.
CN Notice of Allowance dated Dec. 21, 2022 for CN Application No. 202110777109.
CN Notice of Allowance, including Search Report, dated Apr. 26, 2021 for CN Application No. 201711373971, 5 pages.
CN Office Action, including Search Report, dated Feb. 5, 2021 for CN Application No. 201711373971, 5 pages.
CN Office Action, including Search Report, dated Jul. 1, 2020 for CN Application No. 201711373971.
CN Office Action, including Search Report, dated May 31, 2022 for CN Application No. 202110777109, 8 pages.
Communication about intention to grant a European patent dated Nov. 24, 2021 for EP Application No. 17205982, 45 pages.
Communication from the Examining Division dated Nov. 27, 2020 for EP Application No. 17205982.
Decision to grant a European patent received for European Application No. 17205982.6, dated Apr. 7, 2022, 2 pages.
English Translation of CN Notice of Allowance dated Apr. 26, 2021 for CN Application No. 201711373971, 3 pages.
English Translation of CN Office Action dated Dec. 21, 2022 for CN Application No. 202110777109.
English Translation of CN Office Action dated Jul. 1, 2020 for CN Application No. 201711373971.
English Translation of CN Office Action, including Search Report, dated Feb. 5, 2021 for CN Application No. 201711373971, 7 pages.
English Translation of CN Office Action, including Search Report, dated May 31, 2022 for CN Application No. 202110777109, 8 pages.
Examiner initiated interview summary (PTOL-413B) dated Oct. 1, 2019 for U.S. Appl. No. 16/379,380.
Examiner Interview Summary Record (PTOL-413) dated Jan. 24, 2022 for U.S. Appl. No. 16/743,823.
Extended European Search Report in related application No. EP17205982.6, dated May 16, 2018, 8 pages.
Extended European search report dated Jun. 29, 2022 for EP Application No. 22162849, 6 pages.
Final Office Action received for U.S. Appl. No. 16/743,823, dated Jan. 24, 2022, 10 pages.
Final Rejection dated Nov. 6, 2018 for U.S. Appl. No. 15/382,814.
Non-Final Office Action received for U.S. Appl. No. 16/743,823, dated Jul. 21, 2021, 7 pages.
Non-Final Office Action received for U.S. Appl. No. 16/743,823, dated Sep. 2, 2021, 7 pages.
Non-Final Rejection dated May 9, 2018 for U.S. Appl. No. 15/382,814.
Notice of Allowance and Fees Due (PTOL-85) dated Jan. 9, 2019 for U.S. Appl. No. 15/382,814.
Notice of Allowance and Fees Due (PTOL-85) dated Oct. 1, 2019 for U.S. Appl. No. 16/379,380.
Notice of Allowance received for U.S. Appl. No. 16/743,823, dated Jul. 7, 2022, 7 pages.
Notice of Allowance received for U.S. Appl. No. 16/743,823, dated Jul. 22, 2022, 7 pages.
Notice of Allowance received for U.S. Appl. No. 16/743,823, dated Mar. 17, 2022, 10 pages.
Notice of Allowance received for U.S. Appl. No. 16/743,823, dated May 4, 2022, 7 pages.
U.S. Appl. No. 13/367,978, filed Feb. 7, 2012, (Feng et al.); now abandoned.
U.S. Patent Application for Terminal Having Illumination and Focus Control filed May 21, 2014 (Liu et al.); 31 pages; now abandoned, U.S. Appl. No. 14/283,282.
U.S. Appl. No. 14/277,337 for Multipurpose Optical Reader, filed May 14, 2014 (Jovanovski et al.); 59 pages; now abandoned.
U.S. Appl. No. 14/446,391 for Multifunction Point of Sale Apparatus With Optical Signature Capture filed Jul. 30, 2014 (Good et al.); 37 pages; now abandoned.
U.S. Appl. No. 14/676,109 for Indicia Reader filed Apr. 1, 2015 (Huck), now abandoned.
Intention to grant dated Jun. 12, 2023 for EP Application No. 22162849, 9 page(s).
Decision to grant a European patent dated Oct. 19, 2023 for EP Application No. 22162849, 2 page(s).

* cited by examiner

PRINTER-VERIFIERS AND SYSTEMS AND METHODS FOR VERIFYING PRINTED INDICIA

CROSS-REFERENCE TO RELATED APPLICATIONS

This application is a continuation of U.S. application Ser. No. 16/743,823, filed Jan. 15, 2020, which is a continuation of U.S. application Ser. No. 16/379,380, filed Apr. 9, 2019, now U.S. Pat. No. 10,559,075, which is a continuation of U.S. application Ser. No. 15/382,814, filed Dec. 19, 2016, now U.S. Pat. No. 10,304,174, the entire contents of each of which are incorporated herein by reference.

FIELD OF THE INVENTION

The present invention relates to printers, and more particularly relates to printer-verifiers and systems and methods for verifying printed indicia.

BACKGROUND

Conventional indicia printers exist in a variety of forms. Such printers require a supply of print media on which to print the indicia. Indicia have data encoded therein. Indicia are optical representations of data. There are many types of indicia for many applications. Indicia may be one-dimensional barcodes (e.g., Universal Product Code, UPC) having dark lines (i.e., bars) and light lines (i.e., spaces) of various widths arranged along a scan axis. Indicia may be two-dimensional matrix symbols (e.g., Aztec Code, Data Matrix, QR code, etc.) having a two-dimensional array of light features, dark features, and (in some cases) alignment features. Some indicia may use color (e.g., Ultracode) to encode data. The data encoded into a printed indicium such as a barcode may be scanned (i.e., read) by a reader (a barcode reader in the case of reading a barcode).

A print error may be introduced into the printed indicium (e.g., the barcode) for any number of reasons. The print error is a particularly acute problem in the case of barcode printing, as the barcode encodes data in the width of the bar and the space elements. Barcodes are just one type of machine-readable printed indicia in which the tolerance of the printed indicium is closely related to the machine reader's ability to read the printed indicium in a single scan, and to correctly interpret the encoded data. Printed indicium that includes a print error may be rejected by a verifier, that is separate from the printer, in a verification process as not meeting print quality standards. The verifier may be attached to the printer or used as a standalone device to where the user brings the printed indicia for verification. The conventional verifier is not communicatively coupled to the printer.

A conventional verifier automates the verification process by capturing an image of the printed indicium and evaluating the printed indicium in the image according to print quality standards. The printer brands the rejected printed media (including the printed indicium) with the word "void", indicating that the rejected printed media is not useable because of the failure of the printed indicium to meet print quality standards. Unfortunately, the "void" indication is not globally recognized and understood by all printer users, particularly as three-quarters of the world population does not speak English. In addition, in order to brand the rejected printed media, the rejected printed media has to be retracted back into the printer and the void indication printed in a second printing pass, decreasing printing throughput speeds and reducing ribbon life. After the branded rejected printed media exits the printer (i.e., after the second printing pass), a cutting device may be used to separate the branded rejected printed media from the media roll.

Therefore, a need exists for printer-verifiers and systems and methods for verifying printed indicia. The need particularly exists where the English word "void" may not be recognized and/or understood. There is also a need to increase printing throughput speeds and extend ribbon life.

SUMMARY

A printer-verifier is provided for printing and verifying a printed indicium, according to various embodiments of the present invention. The printer-verifier comprises an imaging module for capturing an image of the printed indicium on print media, a memory communicatively coupled to the imaging module and configured to store a print quality verification program, and a processor communicatively coupled to the memory. The processor is configured by the print quality verification program to evaluate a print quality of the printed indicium, determine if the print quality meets a print quality standard, reject the printed indicium on the print media as rejected printed media when the print quality does not meet the print quality standard, and one of output location-specific feedback about the rejected printed media or send a command signal to a cutting device to destroy the rejected printed media. The location-specific feedback is in the same language as a language associated with the printer-verifier.

A verifier is provided, according to various embodiments of the present invention. The verifier comprises an imaging module for capturing an image of a printed indicium from a printer and at least one of the verifier and the printer comprises a memory and a processor communicatively coupled to the memory. The memory is configured to store a print quality verification program and a local language response database comprising a plurality of location-specific messages. Each location-specific message is in a local language of a particular location. The processor is configured by the print quality verification program to evaluate a print quality of the printed indicium, determine if the print quality meets a print quality standard, reject the printed indicium printed on the print media as rejected print media when the print quality standard is not met, and cause the printer to print a location-specific message on the rejected printed media in the same language as the language associated with the printer.

A method for verifying a printed indicium is provided, according to various embodiments. The method comprises evaluating a print quality of a printed indicium from an image captured by an imaging module communicatively coupled to a printer and determining if the printed indicium meets a print quality standard. The printed indicium is rejected as rejected printed media when the print quality standard is not met. A location-specific message is printed on the rejected printed media in the same language as the language associated with the printer.

A method for verifying a printed indicium is provided, according to various embodiments. The method comprises evaluating a print quality of the printed indicium from a captured image thereof and determining that the printed indicium does not meet a print quality standard. The printed indicium is rejected as rejected printed media. A command signal is transmitted to a cutting device to destroy the rejected printed media.

The foregoing illustrative summary, as well as other exemplary objectives and/or advantages of the present invention, and the manner in which the same are accomplished, are further explained within the following detailed description and its accompanying drawings.

DETAILED DESCRIPTION

Figure 1:
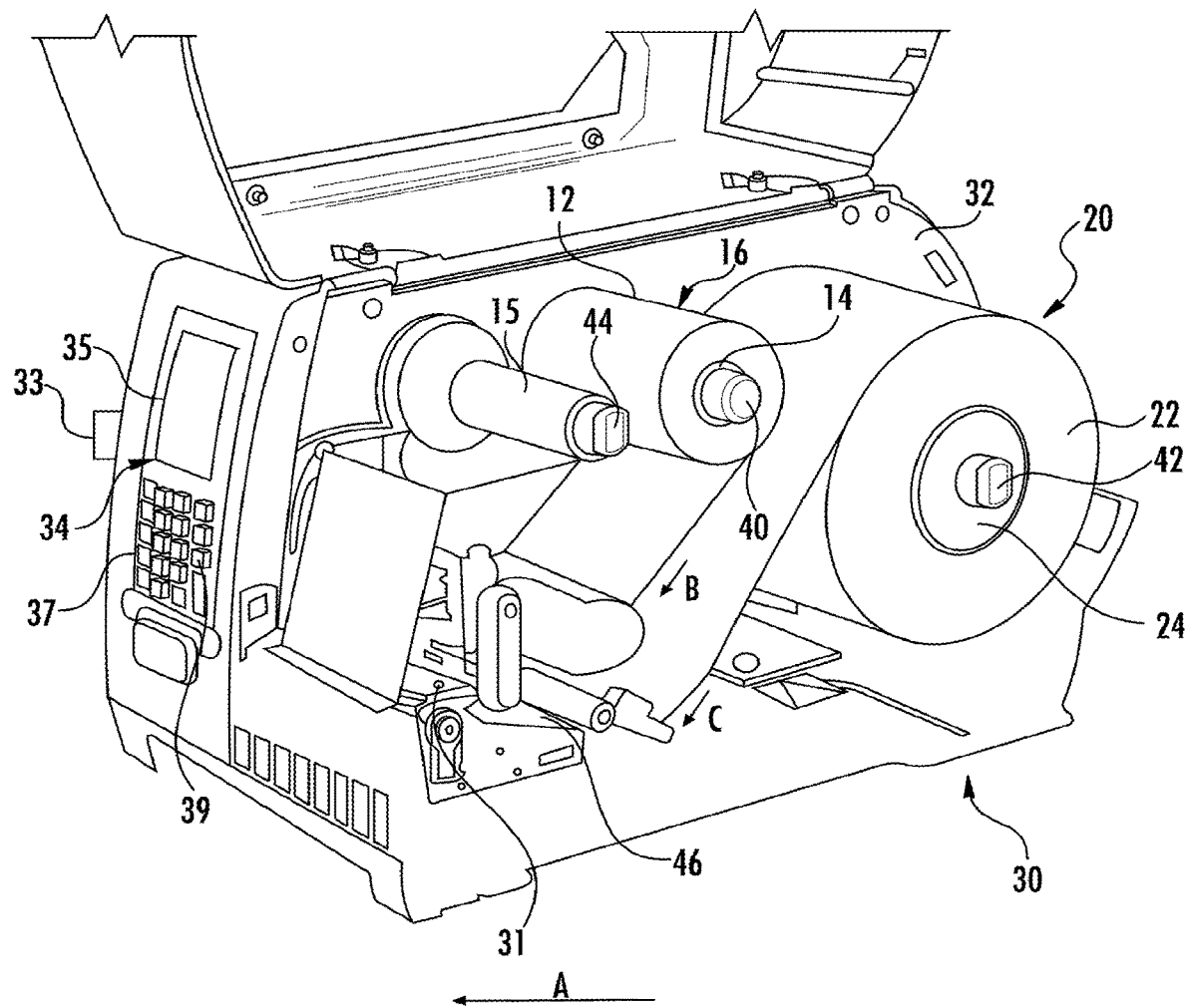
FIG. 1 graphically illustrates a portion of an exemplary printer that may be communicatively coupled to an imaging module or verifier used in methods for verifying a printed indicium according to various embodiments of the present invention, a cover of the printer removed (i.e., an open printer) to illustrate an interior of the printer.

Various embodiments are directed to printer-verifiers and systems and methods for verifying printed indicia. The printed indicia may be verified using location-specific feedback or by automatic destruction after rejection. Various embodiments provide user-friendly location-specific feedback that may be in the same language as the current location of the printer or in a language configured by the user (that may be the local language for the current location of the printer). Various embodiments increase printing throughout speeds and extend ribbon life. Various embodiments are especially helpful in non-English speaking countries. As used herein, the term "verify" or the like refers to rejection followed by branding of rejected printed media using location-specific feedback and rejection followed by automatic destruction of the rejected printed media using a cutting device without first branding the rejected printed media. As used herein, the term "location" refers to a locality, such as a region, a country or nation, a state, a county, a town, a plot, a coordinate, etc. having a local language associated therewith. As used herein, the term "local language" includes the indigenous language associated with the location as well as nonindigenous language associated with the location. For example, Spanish is a nonindigenous language in states that are in the United States and on the United States-Mexico border. In this example, English and Spanish may both be considered local languages. There may be one or more local languages associated with a location.

Various embodiments of the present invention will be described in relation to a thermal transfer printer. However, the present invention may be equally applicable to other types and styles of printers (inclusive of printer-verifiers) (e.g., a direct transfer printer, a laser toner printer, an ink jet printer, etc.). As used herein, the term "printer" refers to a device that prints indicia, text, illustrations, etc. onto print media (e.g., labels, tickets, plain paper, receipt paper, plastic transparencies, and the like). The print media may be continuous or non-continuous. As used herein, the term "indicium" (and the plural term "indicia") refers to an optical representation of data (i.e., data is encoded into an indicium) that may be scanned (i.e., machine read) by a machine-reader. There are many types of indicia for many applications. Indicia may be one-dimensional barcodes (e.g., Universal Product Code, UPC) having dark lines (i.e., bars) and light lines (i.e., spaces) of various widths arranged along a scan axis. Indicia may be two-dimensional matrix symbols (e.g., Aztec Code, Data Matrix, QR code, OCR-B, etc.) having a two-dimensional array of light features, dark features, and (in some cases) alignment features. Some indicia may use color (e.g., Ultracode) to encode data. Indicia are printed on print media. Once printed on print media, the indicia are referred to herein as "printed indicium" or "printed indicia" and the print media on which the indicia are printed is referred to herein as "printed media". The printed medium may be affixed to an item. Often, the encoded data relates to the item(s) on which the printed medium is affixed. The terms "indicium" and "indicia" may be used interchangeably herein.

Figure 2:
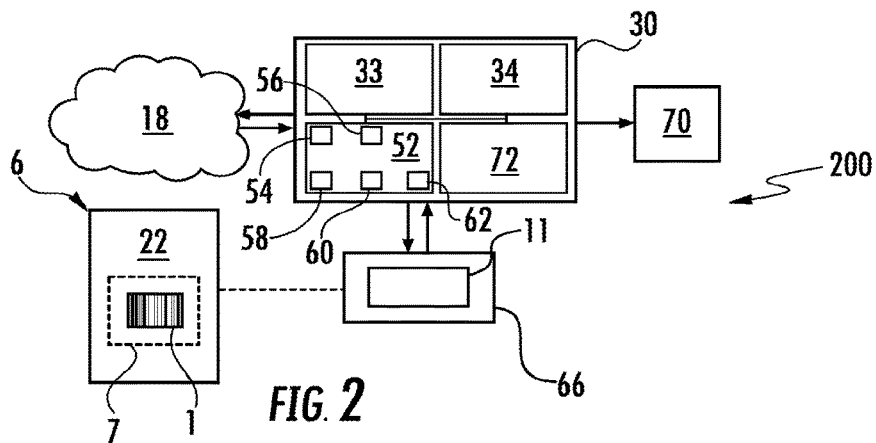
FIG. 2 schematically depicts a block diagram of a system for verifying a printed indicium, illustrating the imaging module communicatively coupled to the exemplary printer of FIG. 1, according to various embodiments of the present invention.
Figure 3:
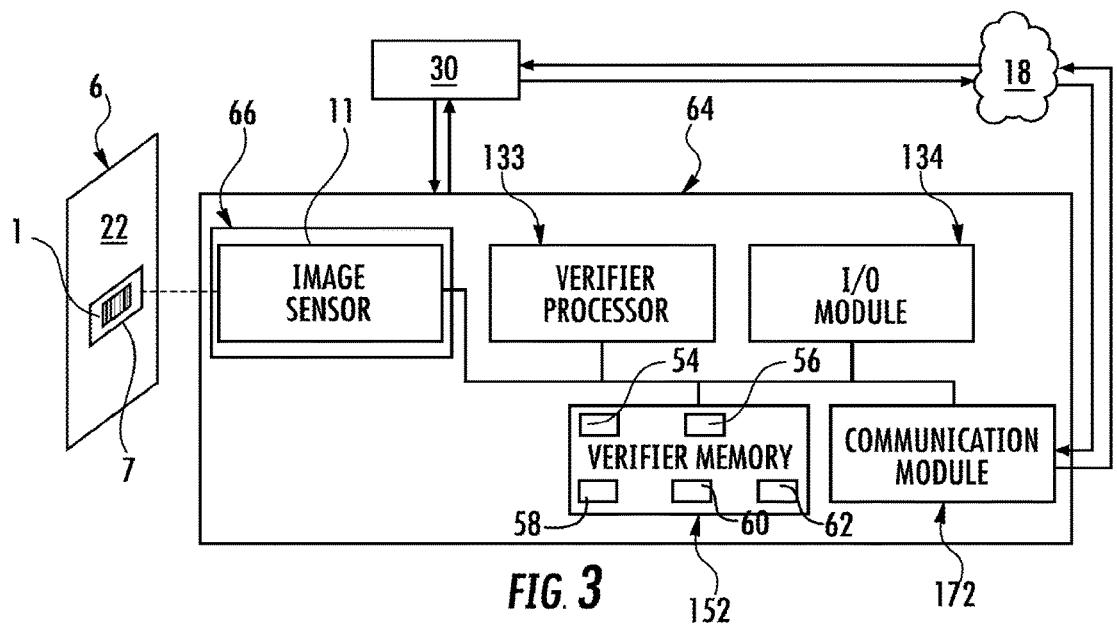
FIG. 3 schematically depicts a block diagram of the printer of FIG. 1 communicatively coupled to an exemplary verifier for capturing and verifying an image of an indicium (e.g., a barcode in FIG. 3) printed on printed media, according to various embodiments of the present invention FIG. 4 graphically illustrates a portion of an exemplary printer-verifier that may be used in methods for verifying a printed indicium according to various embodiments of the present invention, a cover of the printer-verifier removed (i.e., an open printer-verifier) to illustrate an interior of the printer of FIG. 1 including an imaging module and a cutting device (shown schematically in FIG. 4)

Referring now to FIG. 1 and briefly to FIGS. 2 and 3, according to various embodiments, a system 200 for verifying printed indicia is depicted. The system 200 generally comprises a printer 30 (e.g., FIG. 1) communicatively coupled to an imaging module 66. As hereinafter described, the imaging module 66 that is communicatively coupled to the printer 30 may be a separate device (FIG. 2) or disposed in a separate verifier 64 (FIG. 3). The verifier 64 may be attached to the printer 30 or may be a standalone device to where the user brings the printed indicia for verification. In either case, the verifier 64 is communicatively coupled to the printer. In various embodiments as hereinafter described and depicted in FIG. 4, the printer may further comprise the imaging module (i.e., the imaging module 66 is disposed in the printer in which case the printer comprises a printer-verifier 36).

The imaging module 66 is configured to capture an optical image of a printed indicium (e.g., barcode 1 of FIG. 2) within a field of view 7, using an image sensor 11. The indicium is printed on the print media 22, resulting in printed medium 6. The image sensor 11 uses an imaging lens (or lenses) to form a real image of the field of view 7 on an array of photo sensors (e.g., a linear or 2D array CCD, CMOS sensor, etc.). Electronic signals from the photo sensors are used to create gray level or color images. The images may be stored in memory 52/152 and then recalled by the processor 33/133 for verification.

The partially shown exemplary printer 30 depicted in FIG. 1 is capable of printing indicia on print media 22. The depicted printer 30 has a body 32 for enclosing the interior of the printer. The printer 30 further comprises a power source and a moveable cover (removed in FIG. 1 for purposes of illustration) for accessing the interior of the printer. In the case of a thermal transfer printer, there may be a ribbon supply spindle 40 contained within the body 32. A ribbon supply roll 16 is configured to be disposed on the ribbon supply spindle 40. The ribbon supply roll 16 comprises ink ribbon 12 wound on a ribbon supply spool 14. The ink ribbon supplies the media (e.g., ink) that transfers onto the print media. The printer 30 may further comprise a thermal print head 31 utilized to thermally transfer a portion of ink from the ink ribbon 12 to the print media 22 as the ink ribbon is unwound from the ribbon supply spool 14 along a ribbon path (arrow B in FIG. 1) and the print media 22 is unwound from a media supply spool 24 along a media path (arrow C in FIG. 1). The media supply roll 20 comprises the print media 22 wound on the media supply spool 24. A media supply spindle 42 on which the media supply roll 20 is configured to be disposed is contained within the body 32. A ribbon rewind spindle 44 on which unwound ribbon is wound up may also be contained within the body 32. A ribbon take 15 may be disposed on the ribbon rewind spindle 44 although the ribbon take 15 on the ribbon rewind spindle 44 may not be necessary. The printer 30 may further comprise one or more motors (not shown) for rotating the ribbon supply spindle 40 and the ribbon roll 16 disposed thereon (if present) in a forward (arrow A in FIG. 1) or a backward rotational direction (dependent on the ink surface), for rotating the media supply roll 20 disposed on the media supply spindle 42 in a forward rotational direction, and for rotating the ribbon rewind spindle 44. In the direct transfer printer, the ribbon supply spool, the ribbon rewind spool, and the ribbon may be eliminated and a thermally sensitive paper 24 substituted for the print media.

Still referring to FIG. 1, in accordance with various embodiments of the present invention, the printer 30 further comprises a memory 52, a central processing unit (CPU) 33 (herein a "processor") communicatively coupled to the memory 52, and may further comprise a communications module 172. The printer 30 may further comprise a graphical user interface (GUI) 34 for displaying visual and/or auditory information and receiving information from the user (e.g., typed, touched, spoken, etc.). The body 32 of the printer may include the graphical user interface 34 with, for example, a display 35 and a keypad 37 with function buttons 39. Other graphical user interfaces as known in the art may be used, if at all.

The central processing unit (CPU) is the electronic circuitry within a computer that carries out the instructions of a program by performing the basic arithmetic, logical, control, and input/output (I/O) operations specified by the instructions as hereinafter described. The printer 30 may be communicatively connected using the communications module 162 to a computer or a network 18 via a wired or wireless data link. In a wireless configuration, the communications module 162 may communicate with a host device over a network 18 via a variety of communication protocols (e.g., WI-FI®, BLUETOOTH®), CDMA, TDMA, or GSM). In various embodiments of the present invention as hereinafter described, the system 200 may further comprise a cutting device 70 disposed after the printer 30 for purposes as hereinafter described.

In accordance with various embodiments of the present invention, the memory 52 of printer 30 may be configured to store an internal localization database 54, a print quality verification software program 56, and a local language response database (LLRD) 58. The memory 52 may be further configured to store a location-specific formatting database 60 with one or more location-specific formats for the location-specific message(s) printed on rejected printed media as hereinafter described. The display format of the location-specific message may be dictated by the location-specific format. The memory 52 may be further configured to store a print quality standard database 62 as hereinafter described.

The internal localization database 54 includes printer configuration settings including a configuration setting with a language associated with the printer or if the printer is connected to the network 18, the language associated with the printer may be inferred from at least one of a local internet server, a local cellular tower, and a GPS reading. In various embodiments, the language may correspond to a local language associated with the current location of the printer. In various embodiments, the language associated with the printer may be in a different language that the language associated with the current location of the printer. The processor 33 of the printer 30 may receive the configuration setting from, for example, a printer user (e.g., via the graphical user interface (GUI) 34 of FIG. 1).

The LLRD 58 comprises a plurality of location-specific messages 74 (see, e.g., Table 1 below and FIGS. 6 and 7). Each location-specific message 74 may be in a different language. Each location-specific message 74 may be in a local language of a particular location. The location-specific message 74 may be an error message 74a, an instruction message 74b, or both the error message 74a and the instruction message 74b. The error message indicates that the printed indicium is unusable. The error message may be the word "VOID" or the like in the local language. For example, TABLE 1 below shows a plurality of exemplary error messages 74a, each in a local language. The error message may be in any local language and any word or phrase, etc. (i.e., the word does not necessarily have to correspond to "VOID") indicating that the printed indicium is rejected and unusable. As noted previously, there may be more than one local language per location.

TABLE 1

| English | VOID |
|---|---|
| Chinese | 废止 |
| Portuguese | INVALIDAR |
| Russian | аннулировать |

In accordance with various embodiments of the present invention, the processor 33 is communicatively coupled to the memory 52 and configured by the print quality verification program to execute the steps of evaluating a print quality of the printed indicium from a captured image thereof, determining that the printed indicium does not meet a print quality standard, rejecting the printed media (including the printed indicium) as rejected printed media, determining the language associated with the printer, retrieving from memory the location-specific message that is in the same language as the language associated with the printer, and causing the printer to output the location-specific message as the location-specific feedback about the rejected printed media as hereinafter described. In various embodiments, the location-specific feedback is communicated to the user when the processor 33 outputs the location-specific feedback about the rejected printed media (e.g., when the printer brands the rejected printed media with the location-specific message in the same language as the language associated with the printer) In various embodiments, the processor 33 may alternatively or additionally output the location-specific feedback via an audio signal comprising a recorded voice and/or synthesized spoken language. The location-specific feedback may be in the same language as a language associated with a current location of the printer. The location-specific feedback may be provided to the user through the GUI 34 (if present) that is communicatively coupled to the processor.

In accordance with various embodiments, the processor 33 is configured to determine the language associated with the printer from at least one of the configuration setting in the internal localization database 54 of the printer, or if the printer is connected to the network 18, from location details of at least one of the local internet server, the local cellular tower, and the GPS reading. The processor 33 of the printer 30 may receive the configuration setting from, for example, a printer user (e.g., via the graphical user interface (GUI) 34 of FIG. 1). The printer configuration setting and the network 18 may be used as a pointer to the location-specific message in the local language response database (LLRD) 58. As hereinafter described, the language of the location-specific feedback may be determined based on the current location of the printer as inferred from or determined from at least one of the local internet server, local internet tower, GPS setting, and the user input.

Referring again and now specifically to FIG. 3, according to various embodiments, the imaging module 66 is communicatively coupled to the printer and may be disposed in the separate verifier 64. The separate verifier 64 may be attached to the printer 30 or may be a standalone device to where the user brings the printed indicia for verification. In either case, the verifier 64 is communicatively coupled to the printer. The verifier 64 may comprise a memory (a verifier memory 152) electrically connected to the imaging module 66 and a central processing unit (CPU) (herein a "verifier processor" 133). The verifier 64 may further comprise an I/O module 134 and a verifier communications module 172. The subsystems in the verifier 64 of FIG. 3 are electrically connected via a coupler (e.g., wires, traces, etc.) to form an interconnection subsystem. The interconnection system may include power buses or lines, data buses, instruction buses, address buses, etc., which allow operation of the modules/subsystems and the interaction there between. The I/O module 134 may include a verifier graphical user interface. In various embodiments, the verifier 64 may be communicatively connected using the verifier communications module 172 to the computer or the network 18 via a wired or wireless data link. In a wireless configuration, the communication module may communicate with a host device over the network via a variety of communication protocols (e.g., WI-FI®, BLUETOOTH®), CDMA, TDMA, or GSM).

While FIG. 3 suggests a memory 52/152 and a processor 33/133 in both the printer 30 and the verifier 64, it is to be understood that only the printer 30 or only the verifier 64 communicatively coupled thereto may comprise the memory and the processor for executing the steps as hereinafter as hereinafter described, i.e., at least one of the verifier and the printer comprises a memory communicatively coupled to the imaging module and a processor communicatively coupled to the memory. The memory in at least one of the printer and the verifier is configured to store a print quality verification program and a local language response database comprising a plurality of location-specific messages. The processor in at least one of the printer and verifier is configured by the print quality verification program to evaluate a print quality of the printed indicium determine that the print quality does not meet a print quality standard, reject the printed indicium printed on the print media as rejected print media, determine a language associated with the printer, recall from the memory a location-specific message in the same language as the language associated with the printer, and cause the printer to print the location-specific message on the rejected printed media.

In accordance with various embodiments of the present invention, the verifier 64 that is attached to the printer may rely on the memory 52 and the processor 33 of printer 30 for executing the steps as hereinafter described while the verifier 64 that is a standalone device has its own memory 152 and processor 133 for executing the steps as hereinafter described.

Figure 4A:
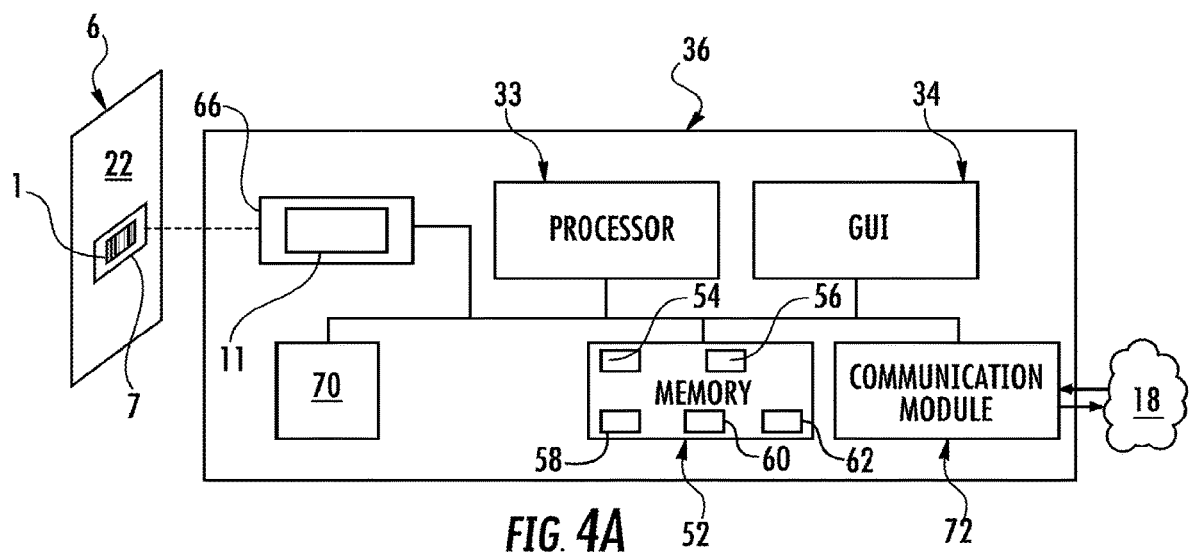
FIG. 4A schematically depicts a block diagram of the printer-verifier of FIG. 4, illustrating the imaging module and cutting device therein, the printer-verifier verifying an exemplary printed indicium (e.g., a barcode) in a verification process in accordance with various embodiments of the present invention.
Figure 4:
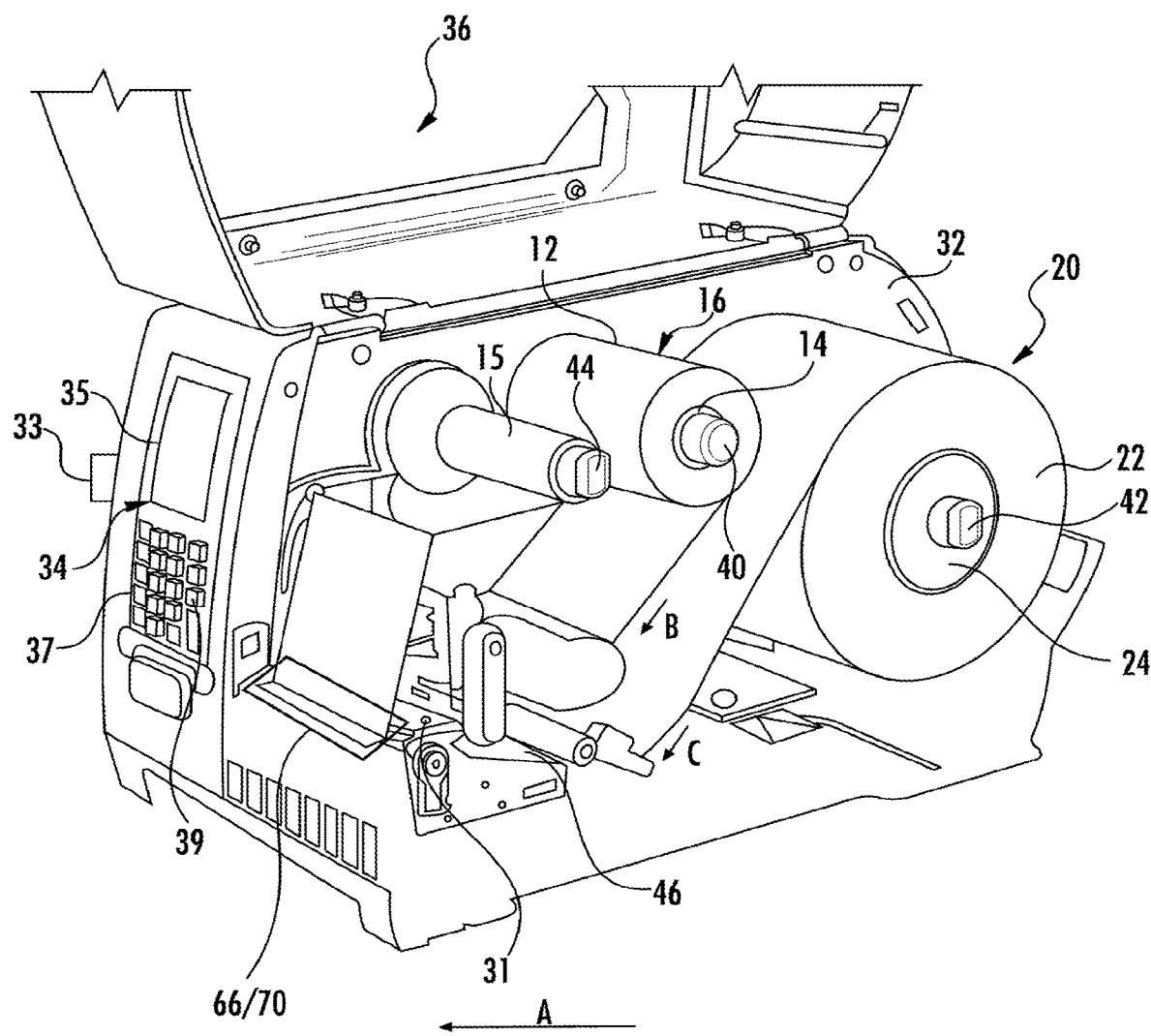

Referring now to FIGS. 4 and 4A, in accordance with various embodiments of the present invention, the printer 30 may further comprise the imaging module 66 (i.e., the imaging module 66 is disposed within the printer 30) (the printer 30 including the imaging module 66 is referred to specifically herein as a "printer-verifier" 36 or printer 36). The printer-verifier 36 depicted in FIGS. 4 and 4A is configured to both capture and verify the image of the indicium printed on print media is depicted. In various embodiments as hereinafter described, the printer-verifier 36 may further comprise the cutting device 70 disposed along the media path after the printed indicium is printed on the print media/print medium for purposes as hereinafter described. Other than inclusion of the imaging module and optional inclusion of the cutting device in the printer-verifier 36, the printer-verifier 36 and the printer 30 as previously described are the same. More specifically, the printer-verifier 36 comprises the imaging module 66 for capturing an image of the printed indicium on print media, the memory 52 communicatively coupled to the imaging module 66 and configured to store a print quality verification program, and the processor 33 communicatively coupled to the memory and configured by the print quality verification program to evaluate a print quality of the printed indicium, determine that the print quality does not meet a print quality standard, reject the printed indicium on the print media as rejected printed media, and one of: output location-specific feedback about the rejected printed media, the location-specific feedback in the same language as a language associated with the printer-verifier, or send a command signal to the cutting device 70 to destroy the rejected printed media. The processor 33 of the printer-verifier is further configured to determine the language associated with the printer-verifier, recall from memory the location-specific message in the same language as the language associated with the printer-verifier, and output the location-specific message as the location-specific feedback in the same manner as the systems depicted in FIGS. 2 and 3.

Figure 5:
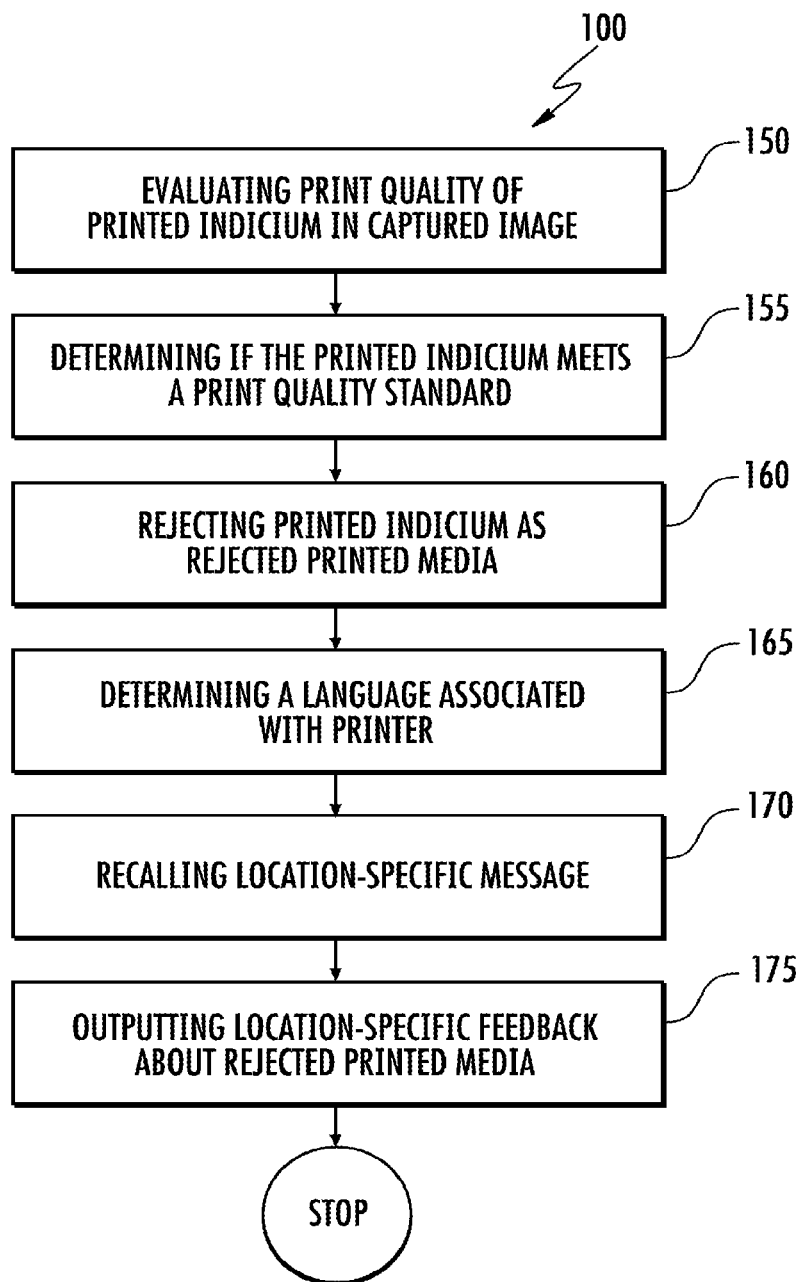
FIG. 5 is a flow diagram of a method for verifying printed indicium using location-specific feedback, according to various embodiments of the present invention.

Referring now to FIG. 5, according to various embodiments, a method 100 for verifying the printed indicium using location-specific feedback comprises evaluating the print quality of the printed indicium (e.g., barcode 1 of FIGS. 2, 3, and 4) in the image (step 150) using the print quality verification program 56. As noted previously, the print quality verification program may be stored in the memory 52 of the printer 30 of FIG. 2, in the memory of at least one of the printer 30 or the verifier 64 (the verifier memory) of FIG. 3, or in the memory 52 of the printer-verifier 36 of FIGS. 4 and 4A.

Still referring to FIG. 5, according to various embodiments, the method 100 for verifying the printed indicium comprises determining if the printed indicium meets one or more print quality standards (step 155). As noted previously, the processor 33 and/or verifier processor 133, configured by the print quality verification program 56, determines that the printed indicium does not meet a print quality standard if the printed indicium deviates therefrom or from acceptable tolerances thereof. Exemplary print quality standards are set forth in International Organization for Standardization/International Electrotechnical Commission (ISO/IEC) 15415, 30116, and 15416. The print quality standards may be stored in the print quality standards database 62 in the memory 52 of the printer 30 and/or in the verifier memory 152.

Still referring to FIG. 5, according to various embodiments, the method 100 for verifying the printed indicium comprises rejecting the printed indicium as rejected print media (step 160), e.g., the indicium is rejected as printed whether the indicium is a portion of the print media (e.g., a sheet) or a particular label affixed to an item. FIGS. 6 and 7 as hereinafter described depict rejected print media 80.

Still referring to FIG. 5, according to various embodiments, the method 100 for verifying the printed indicium comprises determining a language associated with the printer 30/printer-verifier 36 (step 165). While depicted in FIG. 5 as being performed after step 160, it is to be understood that step 165 may be performed prior to any of steps 150, 155, and 160 in the method 100 for verifying the printed indicium (i.e., the current location of the printer 30/printer-verifier 36 may be determined prior to step 150, between 150 and 155, between 155 and 160, or following step 160 as depicted). The processor 33 and/or verifier processor 133 (FIG. 3) is configured to determine the language associated with the printer 30/printer-verifier 36 from at least one of the configuration setting in the internal localization database 54 of the printer 30/36, or if the printer 30/printer-verifier 36 is connected to the network 18, from location details of at least one of the local internet server, the local cellular tower, the GPS reading, and the user. The printer configuration setting and the network 18 may be used as a pointer to the location-specific message in the local language response database (LLRD) 58. As hereinafter described, the language of the location-specific feedback may be determined based on the current location of the printer 30/36.

Still referring to FIG. 5, according to various embodiments, the method 100 for verifying printed indicium comprises recalling, from the LLRD 58, the location-specific message (see, e.g., TABLE 1) associated with the language associated with the printer 30/printer-verifier 36 (step 170). The language associated with the printer 30/printer-verifier may be associated with a particular location that corresponds to the current location of the printer.

Still referring to FIG. 5, according to various embodiments, the method 100 for verifying the printed indicium (e.g., barcode 1 of FIGS. 6 and 7) may comprise outputting the location-specific feedback about the rejected printed media (step 175). The processor 33 and/or verifier processor 133 (FIG. 3) causes the printer 30/printer-verifier 36 to print the location-specific message 74 as the location-specific feedback on the rejected printed media 80 (see, e.g., FIGS. 6 and 7). The location-specific message may be at least partially printed over the printed indicium (e.g., barcode 1 of FIGS. 6 and 7) having the print error.

As noted previously, the location-specific feedback may comprise the location-specific message 74 comprising the error message 74a, the instruction message 74b, or both the error message 74a and the instruction message 74b. The error message 74a indicates that the printed indicium is unusable. The error message may be the word 'VOID' or the like in the local language (see, e.g. TABLE 1).

The location-specific instruction message 74b may provide customized instructions to the printer user as to disposal instructions for the rejected printed media 80. For example, an employer may wish to keep all rejected printed media (e.g., failed labels) for further testing at a later date. In this example, the instruction message "Keep this label for further analysis" or the like may be printed on the rejected printed media 80. Other exemplary instruction messages include "Recycle this Label", "Route to Garbage" or the like. The instruction message 74b may include any instructions. The instruction message 74b may be in the local language or may be in a different language.

Figure 6:
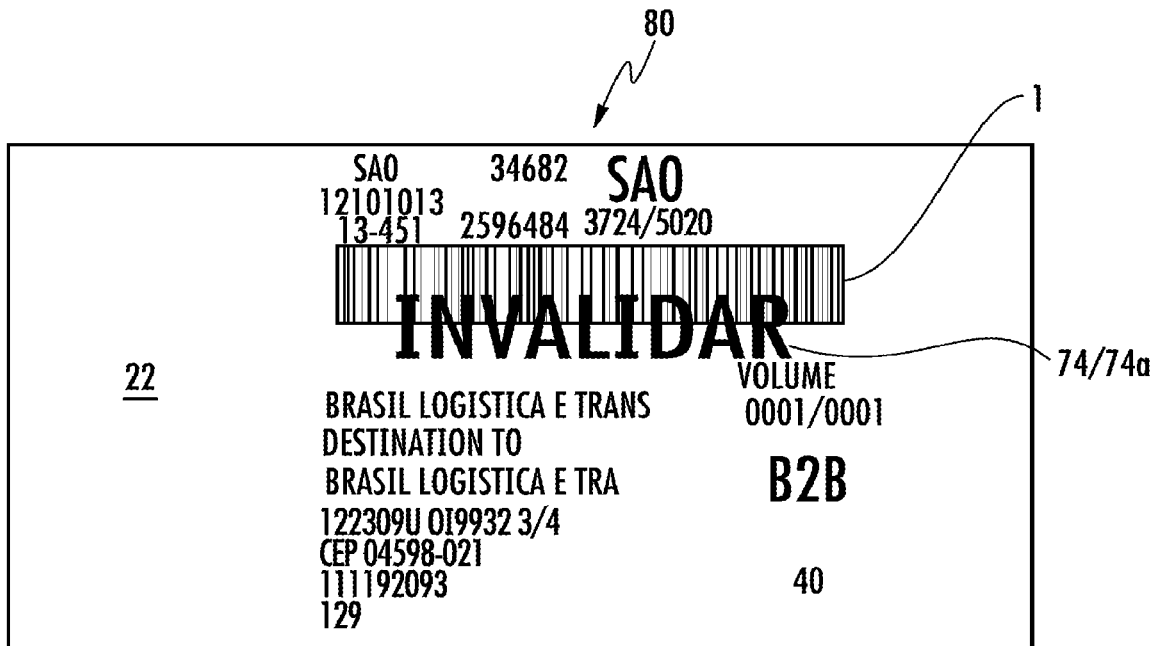
FIG. 6 depicts exemplary rejected printed media on which location-specific feedback is printed thereon, the location-specific feedback comprising a location-specific error message (INVALIDAR) printed on the rejected printed media in a local language (the Portuguese word INVALIDAR corresponds to the English word "VOID"), according to various embodiments of the present invention.
Figure 7:
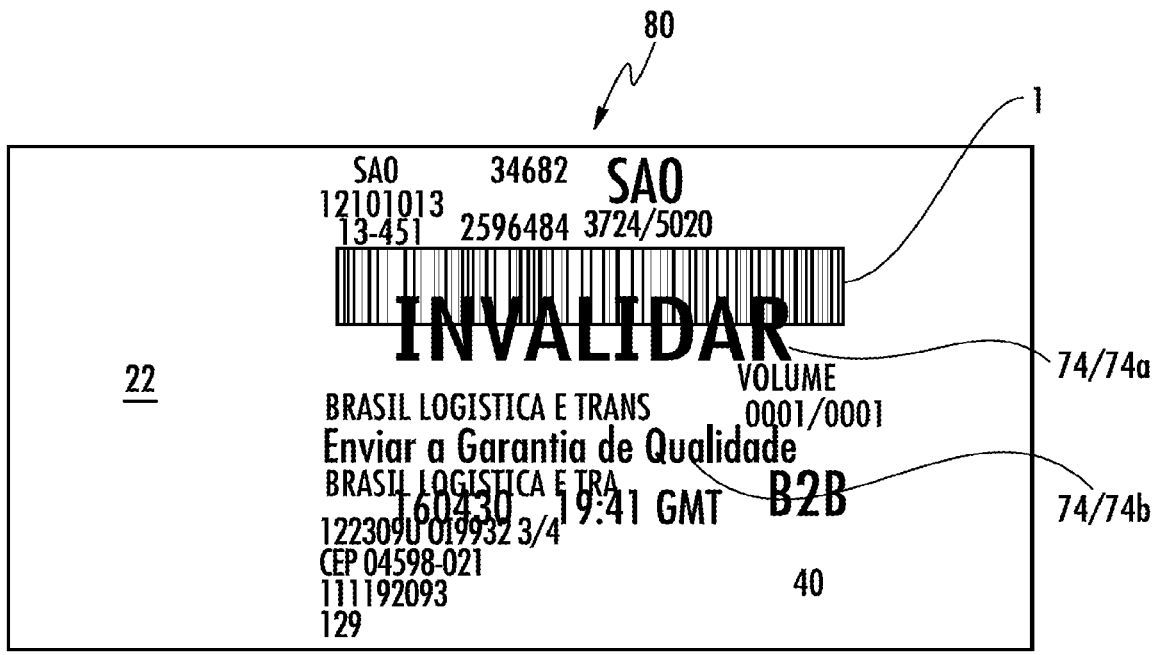
FIG. 7 depicts the rejected printed media of FIG. 6 with both the error message (INVALIDAR) and a location-specific instruction message printed thereon in the local language, the location-specific instruction message in the depicted embodiment including instructions to the user in the local language to route the failed label with the printed indicium (the exemplary rejected printed media) to the Quality Assurance Department (which, in Portuguese, is Enviar a Garantia de Qualidade), the depicted location-specific instruction message also including a time-stamp and other printer-specific information, according to various embodiments of the present invention.

Now referring specifically to FIGS. 6 and 7, according to various embodiments of the present invention, FIG. 6 depicts the exemplary rejected printed media/medium 80 comprising an indicium (e.g., barcode 1) printed on the print media/medium 22 with an exemplary location-specific error message (INVALIDAR) 74a printed thereon in the local language (Portuguese) of a particular location (Brazil, in this case (the Portuguese word INVALIDAR corresponds to the English word "VOID"), according to various embodiments of the present invention. FIG. 7 depicts the error message INVALIDAR 74a and the instruction message 74b printed over the rejected printed media 80 of FIG. 7. The location-specific instruction message in FIG. 7 includes instructions to the user in the local language (Portuguese) to route the rejected printed media to the Quality Assurance Department (which, in Portuguese, is Enviar a Garantia de Qualidade). The instruction message may alternatively or additionally include a time-stamp and/or a printer ID such as depicted in FIG. 7, according to various embodiments of the present invention. In accordance with various embodiments, method 100 provides user-friendly feedback that is recognized and understood. In various embodiments, the location-specific feedback may be alternatively or additionally provided as an audio signal to the user, such as in a voice recording or synthesized spoken language. The rejection may be accompanied by at least one of a bell, whistle, beep, chime, or the like to alert the user to the rejection of the printed indicia.

In some user environments, it may be beneficial to print the error message in a first language and the instruction message in a second language that is different from the first language. The instruction message may be in two or more languages. For instance, in some locations, it may be common to have a large immigrant work population whose first language is not the local language of the location (e.g., the country) in which they reside. It may be to the benefit of the employer in such situations to have the instruction message in multiple languages.

Figure 8:
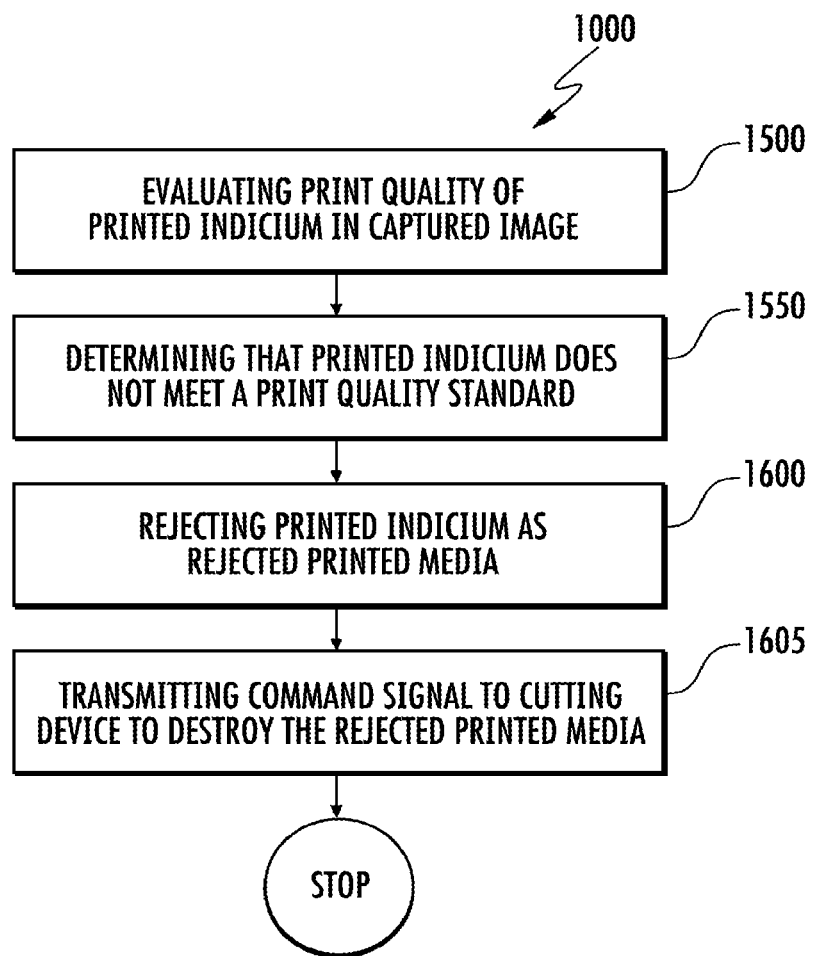
FIG. 8 is a flow diagram of a method for verifying printed indicium that includes transmitting a command signal to a cutting device to destroy rejected printed media, according to various embodiments of the present invention.

Referring now to FIG. 8, according to various embodiments of the present invention, a method 1000 for verifying the indicium printed on print media begins in the same manner as method 100. Method 1000 for verifying the printed indicium comprises step 1500 (evaluating print quality of printed indicium in captured image), step 1550 (determining if the printed indicium meets a print quality standard), and step 1600 (rejecting printed indicium as rejected printed media) (steps 1500, 1550, and 1600 corresponding respectively to steps 150, 155, and 160 of method 100). After step 1600, the method 1000 for verifying the printed indicium continues by the processor of the printer 30/printer-verifier 36 transmitting a command signal to the cutting device 70 to destroy the rejected printed media (step 1605). The cutting device destroys the rejected printed media by cutting the rejected printed media (more particularly, the printed indicium of the rejected printed media) at least once through the printed indicium and up to and including effectively shredding of the rejected printed media.

Method 1000 for verifying the indicium provides several benefits. Destruction of the printed media is a universally understandable event that does not depend on the local language. As the rejected printed media can be destroyed by the cutting device, the rejected printed media does not first have to be branded and then destroyed, thereby increasing printing throughput speeds and extending ribbon life.

From the foregoing, it is to be understood that various embodiments provide location-specific feedback that is in the same language as the language associated with the printer, therefore making the feedback more user-friendly. Various embodiments may also increase printing throughout speeds and extend ribbon life.

To supplement the present disclosure, this application incorporates entirely by reference the following commonly assigned patents, patent application publications, and patent applications:

U.S. Pat. Nos. 6,832,725; 7,128,266; 7,159,783; 7,413,127; 7,726,575; 8,294,969; 8,317,105; 8,322,622; 8,366,005; 8,371,507; 8,376,233; 8,381,979; 8,390,909; 8,408,464; 8,408,468; 8,408,469; 8,424,768; 8,448,863; 8,457,013; 8,459,557; 8,469,272; 8,474,712; 8,479,992; 8,490,877; 8,517,271; 8,523,076; 8,528,818; 8,544,737; 8,548,242; 8,548,420; 8,550,335; 8,550,354; 8,550,357; 8,556,174; 8,556,176; 8,556,177; 8,559,767; 8,599,957; 8,561,895; 8,561,903; 8,561,905; 8,565,107; 8,571,307; 8,579,200; 8,583,924; 8,584,945; 8,587,595; 8,587,697; 8,588,869; 8,590,789; 8,596,539; 8,596,542; 8,596,543; 8,599,271; 8,599,957; 8,600,158; 8,600,167; 8,602,309; 8,608,053; 8,608,071; 8,611,309; 8,615,487; 8,616,454; 8,621,123; 8,622,303; 8,628,013; 8,628,015; 8,628,016; 8,629,926; 8,630,491; 8,635,309; 8,636,200; 8,636,212; 8,636,215; 8,636,224; 8,638,806; 8,640,958; 8,640,960; 8,643,717; 8,646,692; 8,646,694; 8,657,200; 8,659,397; 8,668,149; 8,678,285; 8,678,286; 8,682,077; 8,687,282; 8,692,927; 8,695,880; 8,698,949; 8,717,494; 8,717,494; 8,720,783; 8,723,804; 8,723,904; 8,727,223; U.S. Pat. No. D702,237; U.S. Pat. Nos. 8,740,082; 8,740,085; 8,746,563; 8,750,445; 8,752,766; 8,756,059; 8,757,495; 8,760,563; 8,763,909; 8,777,108; 8,777,109; 8,779,898; 8,781,520; 8,783,573; 8,789,757; 8,789,758; 8,789,759; 8,794,520; 8,794,522; 8,794,525; 8,794,526; 8,798,367; 8,807,431; 8,807,432; 8,820,630; 8,822,848; 8,824,692; 8,824,696; 8,842,849; 8,844,822; 8,844,823; 8,849,019; 8,851,383; 8,854,633; 8,866,963; 8,868,421; 8,868,519; 8,868,802; 8,868,803; 8,870,074; 8,879,639; 8,880,426; 8,881,983; 8,881,987; 8,903,172; 8,908,995; 8,910,870; 8,910,875; 8,914,290; 8,914,788; 8,915,439; 8,915,444; 8,916,789; 8,918,250; 8,918,564; 8,925,818; 8,939,374; 8,942,480; 8,944,313; 8,944,327; 8,944,332; 8,950,678; 8,967,468; 8,971,346; 8,976,030; 8,976,368; 8,978,981; 8,978,983; 8,978,984; 8,985,456; 8,985,457; 8,985,459; 8,985,461; 8,988,578; 8,988,590; 8,991,704; 8,996,194; 8,996,384; 9,002,641; 9,007,368; 9,010,641; 9,015,513; 9,016,576; 9,022,288; 9,030,964; 9,033,240; 9,033,242; 9,036,054; 9,037,344; 9,038,911; 9,038,915; 9,047,098; 9,047,359; 9,047,420; 9,047,525; 9,047,531; 9,053,055; 9,053,378; 9,053,380; 9,058,526; 9,064,165; 9,064,167; 9,064,168; 9,064,254; 9,066,032; 9,070,032;

U.S. Design Pat. No. D716,285;
U.S. Design Pat. No. D723,560;
U.S. Design Pat. No. D730,357;
U.S. Design Pat. No. D730,901;
U.S. Design Pat. No. D730,902;
U.S. Design Pat. No. D733,112;
U.S. Design Pat. No. D734,339;
International Publication No. 2013/163789;
International Publication No. 2013/173985;
International Publication No. 2014/019130;
International Publication No. 2014/110495;
U.S. Patent Application Publication No. 2008/0185432;
U.S. Patent Application Publication No. 2009/0134221;
U.S. Patent Application Publication No. 2010/0177080;
U.S. Patent Application Publication No. 2010/0177076;
U.S. Patent Application Publication No. 2010/0177707;
U.S. Patent Application Publication No. 2010/0177749;
U.S. Patent Application Publication No. 2010/0265880;
U.S. Patent Application Publication No. 2011/0202554;
U.S. Patent Application Publication No. 2012/0111946;
U.S. Patent Application Publication No. 2012/0168511;
U.S. Patent Application Publication No. 2012/0168512;
U.S. Patent Application Publication No. 2012/0193423;
U.S. Patent Application Publication No. 2012/0203647;
U.S. Patent Application Publication No. 2012/0223141;
U.S. Patent Application Publication No. 2012/0228382;
U.S. Patent Application Publication No. 2012/0248188;
U.S. Patent Application Publication No. 2013/0043312;
U.S. Patent Application Publication No. 2013/0082104;
U.S. Patent Application Publication No. 2013/0175341;
U.S. Patent Application Publication No. 2013/0175343;
U.S. Patent Application Publication No. 2013/0257744;
U.S. Patent Application Publication No. 2013/0257759;
U.S. Patent Application Publication No. 2013/0270346;
U.S. Patent Application Publication No. 2013/0287258;
U.S. Patent Application Publication No. 2013/0292475;
U.S. Patent Application Publication No. 2013/0292477;
U.S. Patent Application Publication No. 2013/0293539;
U.S. Patent Application Publication No. 2013/0293540;
U.S. Patent Application Publication No. 2013/0306728;
U.S. Patent Application Publication No. 2013/0306731;
U.S. Patent Application Publication No. 2013/0307964;
U.S. Patent Application Publication No. 2013/0308625;
U.S. Patent Application Publication No. 2013/0313324;
U.S. Patent Application Publication No. 2013/0313325;
U.S. Patent Application Publication No. 2013/0342717;
U.S. Patent Application Publication No. 2014/0001267;
U.S. Patent Application Publication No. 2014/0008439;
U.S. Patent Application Publication No. 2014/0025584;
U.S. Patent Application Publication No. 2014/0034734;
U.S. Patent Application Publication No. 2014/0036848;

U.S. Patent Application Publication No. 2014/0039693;
U.S. Patent Application Publication No. 2014/0042814;
U.S. Patent Application Publication No. 2014/0049120;
U.S. Patent Application Publication No. 2014/0049635;
U.S. Patent Application Publication No. 2014/0061306;
U.S. Patent Application Publication No. 2014/0063289;
U.S. Patent Application Publication No. 2014/0066136;
U.S. Patent Application Publication No. 2014/0067692;
U.S. Patent Application Publication No. 2014/0070005;
U.S. Patent Application Publication No. 2014/0071840;
U.S. Patent Application Publication No. 2014/0074746;
U.S. Patent Application Publication No. 2014/0076974;
U.S. Patent Application Publication No. 2014/0078341;
U.S. Patent Application Publication No. 2014/0078345;
U.S. Patent Application Publication No. 2014/0097249;
U.S. Patent Application Publication No. 2014/0098792;
U.S. Patent Application Publication No. 2014/0100813;
U.S. Patent Application Publication No. 2014/0103115;
U.S. Patent Application Publication No. 2014/0104413;
U.S. Patent Application Publication No. 2014/0104414;
U.S. Patent Application Publication No. 2014/0104416;
U.S. Patent Application Publication No. 2014/0104451;
U.S. Patent Application Publication No. 2014/0106594;
U.S. Patent Application Publication No. 2014/0106725;
U.S. Patent Application Publication No. 2014/0108010;
U.S. Patent Application Publication No. 2014/0108402;
U.S. Patent Application Publication No. 2014/0110485;
U.S. Patent Application Publication No. 2014/0114530;
U.S. Patent Application Publication No. 2014/0124577;
U.S. Patent Application Publication No. 2014/0124579;
U.S. Patent Application Publication No. 2014/0125842;
U.S. Patent Application Publication No. 2014/0125853;
U.S. Patent Application Publication No. 2014/0125999;
U.S. Patent Application Publication No. 2014/0129378;
U.S. Patent Application Publication No. 2014/0131438;
U.S. Patent Application Publication No. 2014/0131441;
U.S. Patent Application Publication No. 2014/0131443;
U.S. Patent Application Publication No. 2014/0131444;
U.S. Patent Application Publication No. 2014/0131445;
U.S. Patent Application Publication No. 2014/0131448;
U.S. Patent Application Publication No. 2014/0133379;
U.S. Patent Application Publication No. 2014/0136208;
U.S. Patent Application Publication No. 2014/0140585;
U.S. Patent Application Publication No. 2014/0151453;
U.S. Patent Application Publication No. 2014/0152882;
U.S. Patent Application Publication No. 2014/0158770;
U.S. Patent Application Publication No. 2014/0159869;
U.S. Patent Application Publication No. 2014/0166755;
U.S. Patent Application Publication No. 2014/0166759;
U.S. Patent Application Publication No. 2014/0168787;
U.S. Patent Application Publication No. 2014/0175165;
U.S. Patent Application Publication No. 2014/0175172;
U.S. Patent Application Publication No. 2014/0191644;
U.S. Patent Application Publication No. 2014/0191913;
U.S. Patent Application Publication No. 2014/0197238;
U.S. Patent Application Publication No. 2014/0197239;
U.S. Patent Application Publication No. 2014/0197304;
U.S. Patent Application Publication No. 2014/0214631;
U.S. Patent Application Publication No. 2014/0217166;
U.S. Patent Application Publication No. 2014/0217180;
U.S. Patent Application Publication No. 2014/0231500;
U.S. Patent Application Publication No. 2014/0232930;
U.S. Patent Application Publication No. 2014/0247315;
U.S. Patent Application Publication No. 2014/0263493;
U.S. Patent Application Publication No. 2014/0263645;
U.S. Patent Application Publication No. 2014/0267609;
U.S. Patent Application Publication No. 2014/0270196;
U.S. Patent Application Publication No. 2014/0270229;
U.S. Patent Application Publication No. 2014/0278387;
U.S. Patent Application Publication No. 2014/0278391;
U.S. Patent Application Publication No. 2014/0282210;
U.S. Patent Application Publication No. 2014/0284384;
U.S. Patent Application Publication No. 2014/0288933;
U.S. Patent Application Publication No. 2014/0297058;
U.S. Patent Application Publication No. 2014/0299665;
U.S. Patent Application Publication No. 2014/0312121;
U.S. Patent Application Publication No. 2014/0319220;
U.S. Patent Application Publication No. 2014/0319221;
U.S. Patent Application Publication No. 2014/0326787;
U.S. Patent Application Publication No. 2014/0332590;
U.S. Patent Application Publication No. 2014/0344943;
U.S. Patent Application Publication No. 2014/0346233;
U.S. Patent Application Publication No. 2014/0351317;
U.S. Patent Application Publication No. 2014/0353373;
U.S. Patent Application Publication No. 2014/0361073;
U.S. Patent Application Publication No. 2014/0361082;
U.S. Patent Application Publication No. 2014/0362184;
U.S. Patent Application Publication No. 2014/0363015;
U.S. Patent Application Publication No. 2014/0369511;
U.S. Patent Application Publication No. 2014/0374483;
U.S. Patent Application Publication No. 2014/0374485;
U.S. Patent Application Publication No. 2015/0001301;
U.S. Patent Application Publication No. 2015/0001304;
U.S. Patent Application Publication No. 2015/0003673;
U.S. Patent Application Publication No. 2015/0009338;
U.S. Patent Application Publication No. 2015/0009610;
U.S. Patent Application Publication No. 2015/0014416;
U.S. Patent Application Publication No. 2015/0021397;
U.S. Patent Application Publication No. 2015/0028102;
U.S. Patent Application Publication No. 2015/0028103;
U.S. Patent Application Publication No. 2015/0028104;
U.S. Patent Application Publication No. 2015/0029002;
U.S. Patent Application Publication No. 2015/0032709;
U.S. Patent Application Publication No. 2015/0039309;
U.S. Patent Application Publication No. 2015/0039878;
U.S. Patent Application Publication No. 2015/0040378;
U.S. Patent Application Publication No. 2015/0048168;
U.S. Patent Application Publication No. 2015/0049347;
U.S. Patent Application Publication No. 2015/0051992;
U.S. Patent Application Publication No. 2015/0053766;
U.S. Patent Application Publication No. 2015/0053768;
U.S. Patent Application Publication No. 2015/0053769;
U.S. Patent Application Publication No. 2015/0060544;
U.S. Patent Application Publication No. 2015/0062366;
U.S. Patent Application Publication No. 2015/0063215;
U.S. Patent Application Publication No. 2015/0063676;
U.S. Patent Application Publication No. 2015/0069130;
U.S. Patent Application Publication No. 2015/0071819;
U.S. Patent Application Publication No. 2015/0083800;
U.S. Patent Application Publication No. 2015/0086114;
U.S. Patent Application Publication No. 2015/0088522;
U.S. Patent Application Publication No. 2015/0096872;
U.S. Patent Application Publication No. 2015/0099557;
U.S. Patent Application Publication No. 2015/0100196;
U.S. Patent Application Publication No. 2015/0102109;
U.S. Patent Application Publication No. 2015/0115035;
U.S. Patent Application Publication No. 2015/0127791;
U.S. Patent Application Publication No. 2015/0128116;
U.S. Patent Application Publication No. 2015/0129659;
U.S. Patent Application Publication No. 2015/0133047;
U.S. Patent Application Publication No. 2015/0134470;
U.S. Patent Application Publication No. 2015/0136851;
U.S. Patent Application Publication No. 2015/0136854;
U.S. Patent Application Publication No. 2015/0142492;

U.S. Patent Application Publication No. 2015/0144692;
U.S. Patent Application Publication No. 2015/0144698;
U.S. Patent Application Publication No. 2015/0144701;
U.S. Patent Application Publication No. 2015/0149946;
U.S. Patent Application Publication No. 2015/0161429;
U.S. Patent Application Publication No. 2015/0169925;
U.S. Patent Application Publication No. 2015/0169929;
U.S. Patent Application Publication No. 2015/0178523;
U.S. Patent Application Publication No. 2015/0178534;
U.S. Patent Application Publication No. 2015/0178535;
U.S. Patent Application Publication No. 2015/0178536;
U.S. Patent Application Publication No. 2015/0178537;
U.S. Patent Application Publication No. 2015/0181093;
U.S. Patent Application Publication No. 2015/0181109;
U.S. patent application Ser. No. 13/367,978 for a Laser Scanning Module Employing an Elastomeric U-Hinge Based Laser Scanning Assembly, filed Feb. 7, 2012 (Feng et al.);
U.S. patent application Ser. No. 29/458,405 for an Electronic Device, filed Jun. 19, 2013 (Fitch et al.);
U.S. patent application Ser. No. 29/459,620 for an Electronic Device Enclosure, filed Jul. 2, 2013 (London et al.);
U.S. patent application Ser. No. 29/468,118 for an Electronic Device Case, filed Sep. 26, 2013 (Oberpriller et al.);
U.S. patent application Ser. No. 14/150,393 for Indicia-reader Having Unitary Construction Scanner, filed Jan. 8, 2014 (Colavito et al.);
U.S. patent application Ser. No. 14/200,405 for Indicia Reader for Size-Limited Applications filed Mar. 7, 2014 (Feng et al.);
U.S. patent application Ser. No. 14/231,898 for Hand-Mounted Indicia-Reading Device with Finger Motion Triggering filed Apr. 1, 2014 (Van Horn et al.);
U.S. patent application Ser. No. 29/486,759 for an Imaging Terminal, filed Apr. 2, 2014 (Oberpriller et al.);
U.S. patent application Ser. No. 14/257,364 for Docking System and Method Using Near Field Communication filed Apr. 21, 2014 (Showering);
U.S. patent application Ser. No. 14/264,173 for Autofocus Lens System for Indicia Readers filed Apr. 29, 2014 (Ackley et al.);
U.S. patent application Ser. No. 14/277,337 for MULTIPURPOSE OPTICAL READER, filed May 14, 2014 (Jovanovski et al.);
U.S. patent application Ser. No. 14/283,282 for TERMINAL HAVING ILLUMINATION AND FOCUS CONTROL filed May 21, 2014 (Liu et al.);
U.S. patent application Ser. No. 14/327,827 for a MOBILE-PHONE ADAPTER FOR ELECTRONIC TRANSACTIONS, filed Jul. 10, 2014 (Hejl);
U.S. patent application Ser. No. 14/334,934 for a SYSTEM AND METHOD FOR INDICIA VERIFICATION, filed Jul. 18, 2014 (Hejl);
U.S. patent application Ser. No. 14/339,708 for LASER SCANNING CODE SYMBOL READING SYSTEM, filed Jul. 24, 2014 (Xian et al.);
U.S. patent application Ser. No. 14/340,627 for an AXIALLY REINFORCED FLEXIBLE SCAN ELEMENT, filed Jul. 25, 2014 (Rueblinger et al.);
U.S. patent application Ser. No. 14/446,391 for MULTIFUNCTION POINT OF SALE APPARATUS WITH OPTICAL SIGNATURE CAPTURE filed Jul. 30, 2014 (Good et al.);
U.S. patent application Ser. No. 14/452,697 for INTERACTIVE INDICIA READER, filed Aug. 6, 2014 (Todeschini);
U.S. patent application Ser. No. 14/453,019 for DIMENSIONING SYSTEM WITH GUIDED ALIGNMENT, filed Aug. 6, 2014 (Li et al.);
U.S. patent application Ser. No. 14/462,801 for MOBILE COMPUTING DEVICE WITH DATA COGNITION SOFTWARE, filed on Aug. 19, 2014 (Todeschini et al.);
U.S. patent application Ser. No. 14/483,056 for VARIABLE DEPTH OF FIELD BARCODE SCANNER filed Sep. 10, 2014 (McCloskey et al.);
U.S. patent application Ser. No. 14/513,808 for IDENTIFYING INVENTORY ITEMS IN A STORAGE FACILITY filed Oct. 14, 2014 (Singel et al.);
U.S. patent application Ser. No. 14/519,195 for HANDHELD DIMENSIONING SYSTEM WITH FEEDBACK filed Oct. 21, 2014 (Laffargue et al.);
U.S. patent application Ser. No. 14/519,179 for DIMENSIONING SYSTEM WITH MULTIPATH INTERFERENCE MITIGATION filed Oct. 21, 2014 (Thuries et al.);
U.S. patent application Ser. No. 14/519,211 for SYSTEM AND METHOD FOR DIMENSIONING filed Oct. 21, 2014 (Ackley et al.);
U.S. patent application Ser. No. 14/519,233 for HANDHELD DIMENSIONER WITH DATA-QUALITY INDICATION filed Oct. 21, 2014 (Laffargue et al.);
U.S. patent application Ser. No. 14/519,249 for HANDHELD DIMENSIONING SYSTEM WITH MEASUREMENT-CONFORMANCE FEEDBACK filed Oct. 21, 2014 (Ackley et al.);
U.S. patent application Ser. No. 14/527,191 for METHOD AND SYSTEM FOR RECOGNIZING SPEECH USING WILDCARDS IN AN EXPECTED RESPONSE filed Oct. 29, 2014 (Braho et al.);
U.S. patent application Ser. No. 14/529,563 for ADAPTABLE INTERFACE FOR A MOBILE COMPUTING DEVICE filed Oct. 31, 2014 (Schoon et al.);
U.S. patent application Ser. No. 14/529,857 for BARCODE READER WITH SECURITY FEATURES filed Oct. 31, 2014 (Todeschini et al.);
U.S. patent application Ser. No. 14/398,542 for PORTABLE ELECTRONIC DEVICES HAVING A SEPARATE LOCATION TRIGGER UNIT FOR USE IN CONTROLLING AN APPLICATION UNIT filed Nov. 3, 2014 (Bian et al.);
U.S. patent application Ser. No. 14/531,154 for DIRECTING AN INSPECTOR THROUGH AN INSPECTION filed Nov. 3, 2014 (Miller et al.);
U.S. patent application Ser. No. 14/533,319 for BARCODE SCANNING SYSTEM USING WEARABLE DEVICE WITH EMBEDDED CAMERA filed Nov. 5, 2014 (Todeschini);
U.S. patent application Ser. No. 14/535,764 for CONCATENATED EXPECTED RESPONSES FOR SPEECH RECOGNITION filed Nov. 7, 2014 (Braho et al.);
U.S. patent application Ser. No. 14/568,305 for AUTO-CONTRAST VIEWFINDER FOR AN INDICIA READER filed Dec. 12, 2014 (Todeschini);
U.S. patent application Ser. No. 14/573,022 for DYNAMIC DIAGNOSTIC INDICATOR GENERATION filed Dec. 17, 2014 (Goldsmith);

U.S. patent application Ser. No. 14/578,627 for SAFETY SYSTEM AND METHOD filed Dec. 22, 2014 (Ackley et al.);
U.S. patent application Ser. No. 14/580,262 for MEDIA GATE FOR THERMAL TRANSFER PRINTERS filed Dec. 23, 2014 (Bowles);
U.S. patent application Ser. No. 14/590,024 for SHELVING AND PACKAGE LOCATING SYSTEMS FOR DELIVERY VEHICLES filed Jan. 6, 2015 (Payne);
U.S. patent application Ser. No. 14/596,757 for SYSTEM AND METHOD FOR DETECTING BARCODE PRINTING ERRORS filed Jan. 14, 2015 (Ackley);
U.S. patent application Ser. No. 14/416,147 for OPTICAL READING APPARATUS HAVING VARIABLE SETTINGS filed Jan. 21, 2015 (Chen et al.);
U.S. patent application Ser. No. 14/614,706 for DEVICE FOR SUPPORTING AN ELECTRONIC TOOL ON A USER'S HAND filed Feb. 5, 2015 (Oberpriller et al.);
U.S. patent application Ser. No. 14/614,796 for CARGO APPORTIONMENT TECHNIQUES filed Feb. 5, 2015 (Morton et al.);
U.S. patent application Ser. No. 29/516,892 for TABLE COMPUTER filed Feb. 6, 2015 (Bidwell et al.);
U.S. patent application Ser. No. 14/619,093 for METHODS FOR TRAINING A SPEECH RECOGNITION SYSTEM filed Feb. 11, 2015 (Pecorari);
U.S. patent application Ser. No. 14/628,708 for DEVICE, SYSTEM, AND METHOD FOR DETERMINING THE STATUS OF CHECKOUT LANES filed Feb. 23, 2015 (Todeschini);
U.S. patent application Ser. No. 14/630,841 for TERMINAL INCLUDING IMAGING ASSEMBLY filed Feb. 25, 2015 (Gomez et al.);
U.S. patent application Ser. No. 14/635,346 for SYSTEM AND METHOD FOR RELIABLE STORE-AND-FORWARD DATA HANDLING BY ENCODED INFORMATION READING TERMINALS filed Mar. 2, 2015 (Sevier);
U.S. patent application Ser. No. 29/519,017 for SCANNER filed Mar. 2, 2015 (Zhou et al.);
U.S. patent application Ser. No. 14/405,278 for DESIGN PATTERN FOR SECURE STORE filed Mar. 9, 2015 (Zhu et al.);
U.S. patent application Ser. No. 14/660,970 for DECODABLE INDICIA READING TERMINAL WITH COMBINED ILLUMINATION filed Mar. 18, 2015 (Kearney et al.);
U.S. patent application Ser. No. 14/661,013 for REPROGRAMMING SYSTEM AND METHOD FOR DEVICES INCLUDING PROGRAMMING SYMBOL filed Mar. 18, 2015 (Soule et al.);
U.S. patent application Ser. No. 14/662,922 for MULTIFUNCTION POINT OF SALE SYSTEM filed Mar. 19, 2015 (Van Horn et al.);
U.S. patent application Ser. No. 14/663,638 for VEHICLE MOUNT COMPUTER WITH CONFIGURABLE IGNITION SWITCH BEHAVIOR filed Mar. 20, 2015 (Davis et al.);
U.S. patent application Ser. No. 14/664,063 for METHOD AND APPLICATION FOR SCANNING A BARCODE WITH A SMART DEVICE WHILE CONTINUOUSLY RUNNING AND DISPLAYING AN APPLICATION ON THE SMART DEVICE DISPLAY filed Mar. 20, 2015 (Todeschini);
U.S. patent application Ser. No. 14/669,280 for TRANSFORMING COMPONENTS OF A WEB PAGE TO VOICE PROMPTS filed Mar. 26, 2015 (Funyak et al.);
U.S. patent application Ser. No. 14/674,329 for AIMER FOR BARCODE SCANNING filed Mar. 31, 2015 (Bidwell);
U.S. patent application Ser. No. 14/676,109 for INDICIA READER filed Apr. 1, 2015 (Huck);
U.S. patent application Ser. No. 14/676,327 for DEVICE MANAGEMENT PROXY FOR SECURE DEVICES filed Apr. 1, 2015 (Yeakley et al.);
U.S. patent application Ser. No. 14/676,898 for NAVIGATION SYSTEM CONFIGURED TO INTEGRATE MOTION SENSING DEVICE INPUTS filed Apr. 2, 2015 (Showering);
U.S. patent application Ser. No. 14/679,275 for DIMENSIONING SYSTEM CALIBRATION SYSTEMS AND METHODS filed Apr. 6, 2015 (Laffargue et al.);
U.S. patent application Ser. No. 29/523,098 for HANDLE FOR A TABLET COMPUTER filed Apr. 7, 2015 (Bidwell et al.);
U.S. patent application Ser. No. 14/682,615 for SYSTEM AND METHOD FOR POWER MANAGEMENT OF MOBILE DEVICES filed Apr. 9, 2015 (Murawski et al.);
U.S. patent application Ser. No. 14/686,822 for MULTIPLE PLATFORM SUPPORT SYSTEM AND METHOD filed Apr. 15, 2015 (Qu et al.);
U.S. patent application Ser. No. 14/687,289 for SYSTEM FOR COMMUNICATION VIA A PERIPHERAL HUB filed Apr. 15, 2015 (Kohtz et al.);
U.S. patent application Ser. No. 29/524,186 for SCANNER filed Apr. 17, 2015 (Zhou et al.);
U.S. patent application Ser. No. 14/695,364 for MEDICATION MANAGEMENT SYSTEM filed Apr. 24, 2015 (Sewell et al.);
U.S. patent application Ser. No. 14/695,923 for SECURE UNATTENDED NETWORK AUTHENTICATION filed Apr. 24, 2015 (Kubler et al.);
U.S. patent application Ser. No. 29/525,068 for TABLET COMPUTER WITH REMOVABLE SCANNING DEVICE filed Apr. 27, 2015 (Schulte et al.);
U.S. patent application Ser. No. 14/699,436 for SYMBOL READING SYSTEM HAVING PREDICTIVE DIAGNOSTICS filed Apr. 29, 2015 (Nahill et al.);
U.S. patent application Ser. No. 14/702,110 for SYSTEM AND METHOD FOR REGULATING BARCODE DATA INJECTION INTO A RUNNING APPLICATION ON A SMART DEVICE filed May 1, 2015 (Todeschini et al.);
U.S. patent application Ser. No. 14/702,979 for TRACKING BATTERY CONDITIONS filed May 4, 2015 (Young et al.);
U.S. patent application Ser. No. 14/704,050 for INTERMEDIATE LINEAR POSITIONING filed May 5, 2015 (Charpentier et al.);
U.S. patent application Ser. No. 14/705,012 for HANDS-FREE HUMAN MACHINE INTERFACE RESPONSIVE TO A DRIVER OF A VEHICLE filed May 6, 2015 (Fitch et al.);
U.S. patent application Ser. No. 14/705,407 for METHOD AND SYSTEM TO PROTECT SOFTWARE-BASED NETWORK-CONNECTED DEVICES FROM ADVANCED PERSISTENT THREAT filed May 6, 2015 (Hussey et al.);
U.S. patent application Ser. No. 14/707,037 for SYSTEM AND METHOD FOR DISPLAY OF INFORMATION USING A VEHICLE-MOUNT COMPUTER filed May 8, 2015 (Chamberlin);

U.S. patent application Ser. No. 14/707,123 for APPLICATION INDEPENDENT DEX/UCS INTERFACE filed May 8, 2015 (Pape);

U.S. patent application Ser. No. 14/707,492 for METHOD AND APPARATUS FOR READING OPTICAL INDICIA USING A PLURALITY OF DATA SOURCES filed May 8, 2015 (Smith et al.);

U.S. patent application Ser. No. 14/710,666 for PREPAID USAGE SYSTEM FOR ENCODED INFORMATION READING TERMINALS filed May 13, 2015 (Smith);

U.S. patent application Ser. No. 29/526,918 for CHARGING BASE filed May 14, 2015 (Fitch et al.);

U.S. patent application Ser. No. 14/715,672 for AUGMENTED REALITY ENABLED HAZARD DISPLAY filed May 19, 2015 (Venkatesha et al.);

U.S. patent application Ser. No. 14/715,916 for EVALUATING IMAGE VALUES filed May 19, 2015 (Ackley);

U.S. patent application Ser. No. 14/722,608 for INTERACTIVE USER INTERFACE FOR CAPTURING A DOCUMENT IN AN IMAGE SIGNAL filed May 27, 2015 (Showering et al.);

U.S. patent application Ser. No. 29/528,165 for IN-COUNTER BARCODE SCANNER filed May 27, 2015 (Oberpriller et al.);

U.S. patent application Ser. No. 14/724,134 for ELECTRONIC DEVICE WITH WIRELESS PATH SELECTION CAPABILITY filed May 28, 2015 (Wang et al.);

U.S. patent application Ser. No. 14/724,849 for METHOD OF PROGRAMMING THE DEFAULT CABLE INTERFACE SOFTWARE IN AN INDICIA READING DEVICE filed May 29, 2015 (Barten);

U.S. patent application Ser. No. 14/724,908 for IMAGING APPARATUS HAVING IMAGING ASSEMBLY filed May 29, 2015 (Barber et al.);

U.S. patent application Ser. No. 14/725,352 for APPARATUS AND METHODS FOR MONITORING ONE OR MORE PORTABLE DATA TERMINALS (Caballero et al.);

U.S. patent application Ser. No. 29/528,590 for ELECTRONIC DEVICE filed May 29, 2015 (Fitch et al.);

U.S. patent application Ser. No. 29/528,890 for MOBILE COMPUTER HOUSING filed Jun. 2, 2015 (Fitch et al.);

U.S. patent application Ser. No. 14/728,397 for DEVICE MANAGEMENT USING VIRTUAL INTERFACES CROSS-REFERENCE TO RELATED APPLICATIONS filed Jun. 2, 2015 (Caballero);

U.S. patent application Ser. No. 14/732,870 for DATA COLLECTION MODULE AND SYSTEM filed Jun. 8, 2015 (Powilleit);

U.S. patent application Ser. No. 29/529,441 for INDICIA READING DEVICE filed Jun. 8, 2015 (Zhou et al.);

U.S. patent application Ser. No. 14/735,717 for INDICIA-READING SYSTEMS HAVING AN INTERFACE WITH A USER'S NERVOUS SYSTEM filed Jun. 10, 2015 (Todeschini);

U.S. patent application Ser. No. 14/738,038 for METHOD OF AND SYSTEM FOR DETECTING OBJECT WEIGHING INTERFERENCES filed Jun. 12, 2015 (Amundsen et al.);

U.S. patent application Ser. No. 14/740,320 for TACTILE SWITCH FOR A MOBILE ELECTRONIC DEVICE filed Jun. 16, 2015 (Bandringa);

U.S. patent application Ser. No. 14/740,373 for CALIBRATING A VOLUME DIMENSIONER filed Jun. 16, 2015 (Ackley et al.);

U.S. patent application Ser. No. 14/742,818 for INDICIA READING SYSTEM EMPLOYING DIGITAL GAIN CONTROL filed Jun. 18, 2015 (Xian et al.);

U.S. patent application Ser. No. 14/743,257 for WIRELESS MESH POINT PORTABLE DATA TERMINAL filed Jun. 18, 2015 (Wang et al.);

U.S. patent application Ser. No. 29/530,600 for CYCLONE filed Jun. 18, 2015 (Vargo et al);

U.S. patent application Ser. No. 14/744,633 for IMAGING APPARATUS COMPRISING IMAGE SENSOR ARRAY HAVING SHARED GLOBAL SHUTTER CIRCUITRY filed Jun. 19, 2015 (Wang);

U.S. patent application Ser. No. 14/744,836 for CLOUD-BASED SYSTEM FOR READING OF DECODABLE INDICIA filed Jun. 19, 2015 (Todeschini et al.);

U.S. patent application Ser. No. 14/745,006 for SELECTIVE OUTPUT OF DECODED MESSAGE DATA filed Jun. 19, 2015 (Todeschini et al.);

U.S. patent application Ser. No. 14/747,197 for OPTICAL PATTERN PROJECTOR filed Jun. 23, 2015 (Thuries et al.);

U.S. patent application Ser. No. 14/747,490 for DUAL-PROJECTOR THREE-DIMENSIONAL SCANNER filed Jun. 23, 2015 (Jovanovski et al.); and U.S. patent application Ser. No. 14/748,446 for CORDLESS INDICIA READER WITH A MULTIFUNCTION COIL FOR WIRELESS CHARGING AND EAS DEACTIVATION, filed Jun. 24, 2015 (Xie et al.).

Example Embodiments

A1. A system for verifying a printed indicium comprising:
an imaging module for capturing an image of the printed indicium;
a printer communicatively coupled to the imaging module and comprising:
  a memory configured to store a print quality verification program; and
  a processor communicatively coupled to the memory and configured by the print quality verification program to:
    evaluate a print quality of the printed indicium from the image;
    determine if the print quality meets a print quality standard;
    reject the printed indicium printed on the print media as rejected print media when the print quality does not meet the print quality standard; and
    one of:
      output location-specific feedback about the rejected printed media, the location-specific feedback in the same language as a language associated with the printer, or
      send a command signal to a cutting device to destroy the rejected printed media.

A2. The system according to claim 1, wherein the memory is further configured to store a local language response database comprising a plurality of location-specific messages, each location-specific message in a different language and the processor configured to output the location-specific feedback is further configured to:

determine the language associated with the printer prior to outputting the location-specific feedback about the rejected printed media;
recall from the memory a location-specific message that is in the same language as the language associated with the printer; and
cause the printer to print the location-specific message on the rejected printed media, the location-specific message comprising the location-specific feedback.

A3. The system according to claim 1, wherein the language of the location-specific message is determined based on the current location of the printer.

A4. The system according to claim 1, wherein the processor is configured to determine the language associated with the printer from at least one of a configuration setting in an internal localization database of the printer, or if the printer is connected to a network, from location details of at least one of a local internet server, a local cellular tower, and a GPS setting.

A5. The system according to claim 1, wherein the location-specific message comprises an error message, an instruction message, or both the error message and the instruction message.

A6. The system according to claim 1, wherein the error message is in the local language comprising a first language and the instruction message is in a second language that is different from the first language.

In the specification and/or figures, typical embodiments of the invention have been disclosed. The present invention is not limited to such exemplary embodiments. The use of the term "and/or" includes any and all combinations of one or more of the associated listed items. The figures are schematic representations and so are not necessarily drawn to scale. Unless otherwise noted, specific terms have been used in a generic and descriptive sense and not for purposes of limitation.

The invention claimed is:

1. A printer comprising:
an imaging module configured to capture an image of a printed indicium on a printed media;
a processor communicatively coupled to the imaging module and configured to:
evaluate a print quality of the printed indicium from the image of the printed indicium captured by the imaging module;
retrieve location-specific feedback from a plurality of location-specific feedback stored in a memory based on a language corresponding to a specific location of the printer; and
cause the printer to print the location-specific feedback in the language corresponding to the specific location of the printer on a rejected printed media, wherein the language comprises a human language.

2. The printer according to claim 1, wherein the processor is configured to generate an audio feedback in the language corresponding to the specific location of the printer.

3. The printer according to claim 2, wherein the audio feedback comprises at least one of a recorded language and a synthesized spoken language.

4. The printer according to claim 1, wherein the processor is configured to determine the language based on a current location of the printer determined from at least one of a configuration setting in an internal localization database of the printer, or from location details of at least one of a local interne server, a local cellular tower, and a GPS setting, to which the printer is connected.

5. The printer according to claim 1, wherein the location-specific feedback comprises an error message, an instruction message, or both the error message and the instruction message.

6. The printer according to claim 1, wherein retrieving the location-specific feedback comprises:
retrieving a first message in a first language corresponding to the specific location of the printer; and
retrieving a second message in a second language corresponding to a language preferred by a printer user.

7. The printer according to claim 6, wherein the first message corresponds to an error message, and wherein the second message corresponds to an instruction message.

8. A method for operating a printer comprising:
causing, by a processor, an imaging module to capture an image of a printed indicium on a printed media;
evaluating, by the processor, a print quality of the printed indicium from the image of the printed indicium captured by the imaging module;
retrieving, by the processor, a location-specific feedback from a plurality of location-specific feedback stored in a memory based on a first language corresponding to a specific location of the printer and a second language corresponding to a language preferred by a printer user; and
causing the processor to print the location-specific feedback in the first language and the second language on a rejected printed media, wherein the first language and the second language comprise a human language.

9. The method according to claim 8, wherein the processor is configured to generate an audio feedback in the first language corresponding to the specific location of the printer.

10. The method according to claim 9, wherein the audio feedback comprises at least one of a recorded language and a synthesized spoken language.

11. The method according to claim 8, further comprising:
determining, by the processor, the first language and the second language based on a current location of the printer determined from at least one of a configuration setting in an internal localization database of the printer, or from location details of at least one of a local internet server, a local cellular tower, and a GPS setting, to which the printer is connected.

12. The method according to claim 8, wherein the location-specific feedback comprises an error message, an instruction message, or both the error message and the instruction message.

13. A method comprising:
evaluating, by a processor, a print quality of a printed indicium from an image of the printed indicium;
retrieving, by the processor, a location-specific feedback from a plurality of location-specific feedback stored in a memory based on a language corresponding to a specific location of a computing device; and
causing the processor to print the location-specific feedback in the language corresponding to the specific location of the computing device on a rejected printed media, wherein the language comprises a human language.

14. The method according to claim 13, further comprising:
causing, by the processor, an imaging module associated with the computing device to capture the image of the printed indicium.

15. The method according to claim 13, wherein the processor is configured to generate an audio feedback in the language corresponding to the specific location of the computing device.

16. The method according to claim 15, wherein the audio feedback comprises at least one of a recorded language and a synthesized spoken language.

17. The method according to claim 13, further comprising:
   determining, by the processor, the language based on a current location of the computing device, wherein the current location of the computing device is determined from at least one of a configuration setting in an internal localization database of the computing device, or from location details of at least one of a local interne server, a local cellular tower, and a GPS setting, to which the computing device is connected.

18. The method according to claim 13, wherein the location-specific feedback comprises an error message, an instruction message, or both the error message and the instruction message.

19. The method according to claim 13, wherein retrieving the location-specific feedback comprises retrieving a first message in a first language corresponding to the specific location of the computing device and retrieving a second message in a second language corresponding to a language preferred by a user of the computing device.

20. The method according to claim 19, wherein the first message corresponds to an error message, and wherein the second message corresponds to an instruction message.

* * * * *